US012647226B2

(12) United States Patent
Abebe et al.

(10) Patent No.: US 12,647,226 B2
(45) Date of Patent: Jun. 2, 2026

(54) METHOD AND APPARATUS FOR SELECTING DEFAULT BEAM AND PATHLOSS REFERENCE SIGNAL FOR TRANSMISSION OF SOUNDING REFERENCE SIGNAL IN WIRELESS COMMUNICATION SYSTEMS

(71) Applicant: Samsung Electronics Co., Ltd., Suwon-si (KR)

(72) Inventors: Ameha Tsegaye Abebe, Suwon-si (KR); Dhivagar Baskaran, Bangalore (IN); Youngrok Jang, Suwon-si (KR); Younsun Kim, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 669 days.

(21) Appl. No.: 17/697,851

(22) Filed: Mar. 17, 2022

(65) Prior Publication Data

US 2022/0303093 A1    Sep. 22, 2022

(30) Foreign Application Priority Data

Mar. 19, 2021    (IN) .............................. 202131011827

(51) Int. Cl.
| | |
|---|---|
| *H04L 5/00* | (2006.01) |
| *H04W 52/24* | (2009.01) |
| *H04W 52/32* | (2009.01) |

(52) U.S. Cl.
CPC ......... *H04L 5/0048* (2013.01); *H04W 52/242* (2013.01); *H04W 52/325* (2013.01)

(58) Field of Classification Search
CPC .. H04L 5/0048; H04L 5/0094; H04W 52/242; H04W 52/325
See application file for complete search history.

(56) References Cited

U.S. PATENT DOCUMENTS

| | | | | |
|---|---|---|---|---|
| 10,973,044 | B1 * | 4/2021 | Venugopal | .............. H04L 5/001 |
| 11,425,706 | B2 * | 8/2022 | Cirik | ...................... H04B 7/088 |

(Continued)

FOREIGN PATENT DOCUMENTS

WO        2021/011442 A1      1/2021

OTHER PUBLICATIONS

3GPP TS 38.211 V16.4.0 (Dec. 2020), Technical Specification, 3rd Generation Partnership Project; Technical Specification Group Radio Access Network; NR; Physical channels and modulation (Release 16), Dec. 2020, 133 pages.

(Continued)

*Primary Examiner* — Liton Miah

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to an embodiment of the present invention, efficient uplink transmission can be performed.

16 Claims, 18 Drawing Sheets

(56) References Cited

U.S. PATENT DOCUMENTS

| | | | | |
|---|---|---|---|---|
| 11,546,043 | B2 * | 1/2023 | Zhou | H04B 7/0628 |
| 11,632,756 | B2 * | 4/2023 | Xu | H04W 80/02 |
| | | | | 370/329 |
| 11,924,881 | B2 * | 3/2024 | Jeon | H04W 74/0833 |
| 2019/0261320 | A1 | 8/2019 | Yu et al. | |
| 2020/0052802 | A1 | 2/2020 | Ryu et al. | |
| 2022/0173788 | A1 * | 6/2022 | Kang | H04L 1/1864 |
| 2022/0210862 | A1 * | 6/2022 | Cirik | H04W 72/21 |
| 2023/0044148 | A1 * | 2/2023 | Kang | H04L 1/1864 |
| 2023/0127256 | A1 * | 4/2023 | Cha | H04W 52/242 |
| | | | | 370/318 |

OTHER PUBLICATIONS

3GPP TS 38.212 V16.4.0 (Dec. 2020), Technical Specification, 3rd Generation Partnership Project; Technical Specification Group Radio Access Network; NR; Multiplexing and channel coding (Release 16), Dec. 2020, 152 pages.
3GPP TS 38.213 V15.12.0 (Dec. 2020), Technical Specification, 3rd Generation Partnership Project; Technical Specification Group Radio Access Network; NR; Physical layer procedures for control (Release 15), Dec. 2020, 110 pages.
3GPP TS 38.213 V16.4.0 (Dec. 2020), Technical Specification, 3rd Generation Partnership Project; Technical Specification Group Radio Access Network; NR; Physical layer procedures for control (Release 16), Dec. 2020, 181 pages.
3GPP TS 38.214 V15.11.0 (Sep. 2020), Technical Specification, 3rd Generation Partnership Project; Technical Specification Group Radio Access Network; NR; Physical layer procedures for data (Release 15), Sep. 2020, 106 pages.
3GPP TS 38.214 V16.4.0 (Dec. 2020), Technical Specification, 3rd Generation Partnership Project; Technical Specification Group Radio Access Network; NR; Physical layer procedures for data (Release 16), Dec. 2020, 169 pages.
3GPP TS 38.215 V16.4.0 (Dec. 2020), Technical Specification, 3rd Generation Partnership Project; Technical Specification Group Radio Access Network; NR; Physical layer measurements (Release 16), Dec. 2020, 25 pages.
3GPP TS 38.321 V16.3.0 (Dec. 2020), Technical Specification, 3rd Generation Partnership Project; Technical Specification Group Radio Access Network; NR; Medium Access Control (MAC) protocol specification (Release 16), Dec. 2020, 156 pages.
3GPP TS 38.331 V16.3.1 (Jan. 2021), Technical Specification, 3rd Generation Partnership Project; Technical Specification Group Radio Access Network; NR; Radio Resource Control (RRC) protocol specification (Release 16), Jan. 2021, 937 pages.
Samsung, "New WID: Further enhancements on MIMO for NR ," RP-193133, 3GPP TSG RAN Meeting #86, Sitges, Spain, Dec. 9-12, 2019, 5 pages.
Apple Inc., "On Multi-TRP Reliability Enhancement", 3GPP TSG-RAN WG1 Meeting #104-e, Jan. 25-Feb. 5, 2021, R1-2101351, 12 pages.
Ericsson, "On PDCCH, PUCCH and PUSCH enhancements", 3GPP TSG-RAN WG1 Meeting #104e, Jan. 26-Feb. 12, 2021, R1-2101654, 23 pages.
International Search Report dated Jun. 30, 2022 in connection with International Patent Application No. PCT/KR2022/003854, 3 pages.
Written Opinion of the International Searching Authority dated Jun. 30, 2022 in connection with International Patent Application No. PCT/KR2022/003854, 5 pages.
Supplementary European Search Report dated Jun. 12, 2024, in connection with European Application No. 22771830.1, 10 pages.

* cited by examiner

Figure 5:
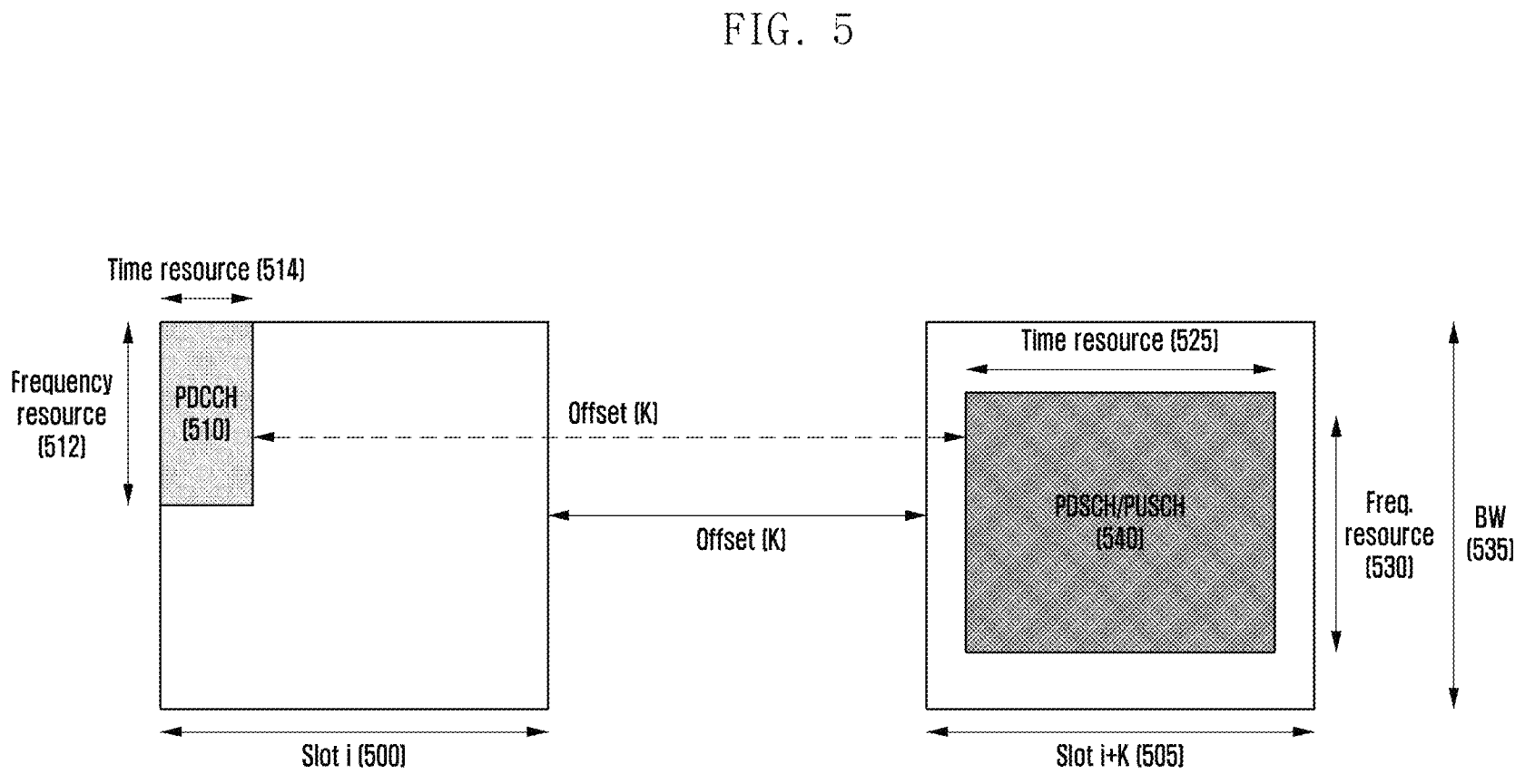

Freq. resource [530]

Time resource [525]

PDSCH/PUSCH [540]

Slot i+K [505]

Offset [K]

Offset [K]

Time resource [514]

PDCCH [510]

Slot i [500]

Frequency resource [512]

FIG. 8

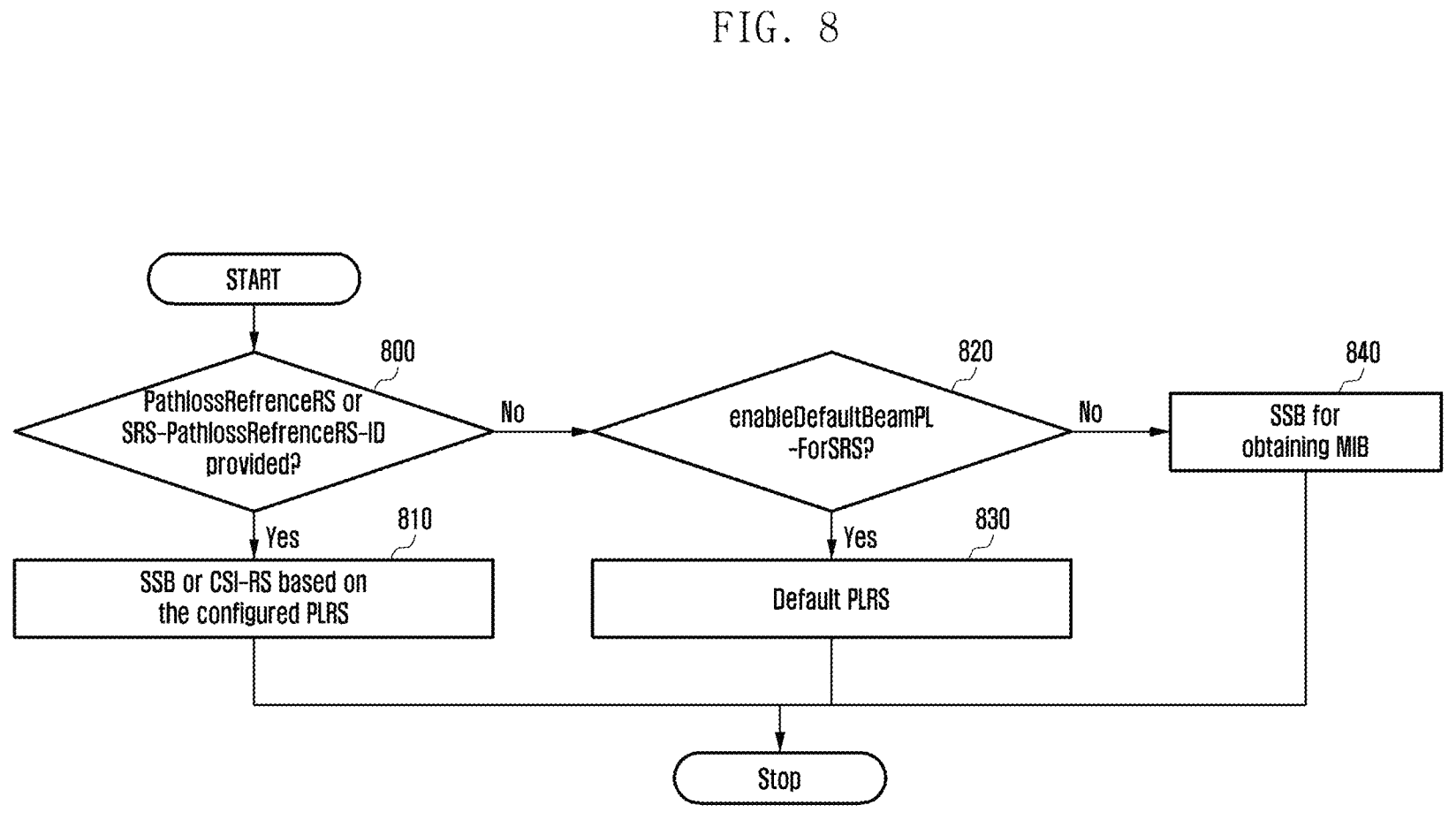

START

800 — PathlossRefrenceRS or SRS-PathlossRefrenceRS-ID provided?

No → 820 — enableDefaultBeamPL-ForSRS?

No → 840 — SSB for obtaining MIB

Yes → 810 — SSB or CSI-RS based on the configured PLRS

Yes → 830 — Default PLRS

Stop

FIG. 9

METHOD AND APPARATUS FOR SELECTING DEFAULT BEAM AND PATHLOSS REFERENCE SIGNAL FOR TRANSMISSION OF SOUNDING REFERENCE SIGNAL IN WIRELESS COMMUNICATION SYSTEMS

CROSS-REFERENCE TO RELATED APPLICATIONS

This application is based on and claims priority under 35 U.S.C. § 119 to Indian Patent Application No. 202131011827, filed on Mar. 19, 2021, in the Indian Intellectual Property Office, the disclosure of which is incorporated by reference herein in its entirety.

BACKGROUND

1. Field

The present disclosure relates to the field of 5G communication networks and more particularly to the behaviour of user equipment (UE) towards selecting a default beam and pathloss reference signal (PL-RS) for the transmission of sounding reference signal (SRS).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

The principal object of the disclosure herein is to disclose methods and apparatus for selecting the default beam, or the transmitter spatial filter, upon transmission of SRS in communication networks, wherein the communication network is at least one of the fifth generation (5G) standalone network and a 5G non-standalone (NAS) network.

Another object of disclosure herein is to disclose methods and systems for selecting the default PLRS for measurement of pathloss upon transmission of SRS in 5G communication network.

Another object of the disclosure herein is to disclose methods and apparatus for selecting default beam and default PLRS upon SRS resource sets transmission intended for multiple transmission and reception points (mTRP).

SUMMARY

The present disclosure has been made to address the above-mentioned problems and disadvantages, and to provide at least the advantages described below.

In accordance with an aspect of the present disclosure, a method performed by a terminal in a wireless communication system is provided. The method includes receiving, from a base station, configuration information associated with a sounding reference signal (SRS), the configuration information including an indicator indicating a default pathloss reference signal (PL-RS) is enabled; identifying an SRS transmission power based on a downlink pathloss (PL) obtained by the terminal; and transmitting, to the base station, the SRS based on the identified SRS transmission power, wherein the downlink PL is based on a PL-RS with an RS resource index, and wherein the RS resource index corresponds to a periodic RS resource configured as quasi-co-located (QCL) type D in a first transmission configuration indicator (TCI) state associated with a control resource set (CORESET) of a lowest index, in case that the CORESET is associated with a plurality of activated TCI states.

In accordance with another aspect of the present disclosure, a method performed by a base station in a wireless communication system is provided, the method includes transmitting, to a terminal, configuration information associated with a sounding reference signal (SRS), the configuration information including an indicator indicating a default pathloss reference signal (PL-RS) is enabled; and receiving, from the terminal, the SRS, wherein an SRS transmission power of the SRS is based on a downlink pathloss (PL), wherein the downlink PL is based on a PL-RS with an RS resource index, and wherein the RS resource index corresponds to a periodic RS resource configured as quasi-co-located (QCL) type D in a first transmission configuration indicator (TCI) state associated with a control resource set (CORESET) of a lowest index, in case that the CORESET is associated with a plurality of activated TCI states.

In accordance with another aspect of the present disclosure, a terminal for receiving data in a wireless communication system is provided. The terminal includes a transceiver and a controller coupled with the transceiver and configured to receive, from a base station, configuration information associated with a sounding reference signal (SRS), the configuration information including an indicator indicating a default pathloss reference signal (PL-RS) is enabled, identify an SRS transmission power based on a downlink pathloss (PL) obtained by the terminal, and transmit, to the base station, the SRS based on the identified SRS transmission power, wherein the downlink PL is based on a PL-RS with an RS resource index, and wherein the RS resource index corresponds to a periodic RS resource configured as quasi-co-located (QCL) type D in a first transmission configuration indicator (TCI) state associated with a control resource set (CORESET) of a lowest index, in case that the CORESET is associated with a plurality of activated TCI states.

In accordance with another aspect of the present disclosure, a base station for transmitting data in a wireless communication system is provided. The base station includes a transceiver and a controller coupled with the transceiver and configured to transmit, to a terminal, configuration information associated with a sounding reference signal (SRS), the configuration information including an indicator indicating a default pathloss reference signal (PL-RS) is enabled, and receive, from the terminal, the SRS, wherein an SRS transmission power of the SRS is based on a downlink pathloss (PL), wherein the downlink PL is based on a PL-RS with an RS resource index, and wherein the RS resource index corresponds to a periodic RS resource configured as quasi-co-located (QCL) type D in a first transmission configuration indicator (TCI) state associated with a control resource set (CORESET) of a lowest index, in case that the CORESET is associated with a plurality of activated TCI states.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIG. 5 illustrates a downlink or uplink scheduling method and a resource area in an NR system according to an embodiment of the disclosure;

FIG. 8 illustrates a flowchart for the 5G release 16 communication network (Rel. 16) new radio (NR)-based PL-RS acquisition for SRS transmission according to an embodiment of disclosure;

FIG. 9 illustrates a flowchart for the 5G release 16 communication network (Rel. 16) new radio (NR)-based beam (spatial setting) acquisition for SRS transmission according to an embodiment of disclosure;

DETAILED DESCRIPTION

Figure 1:
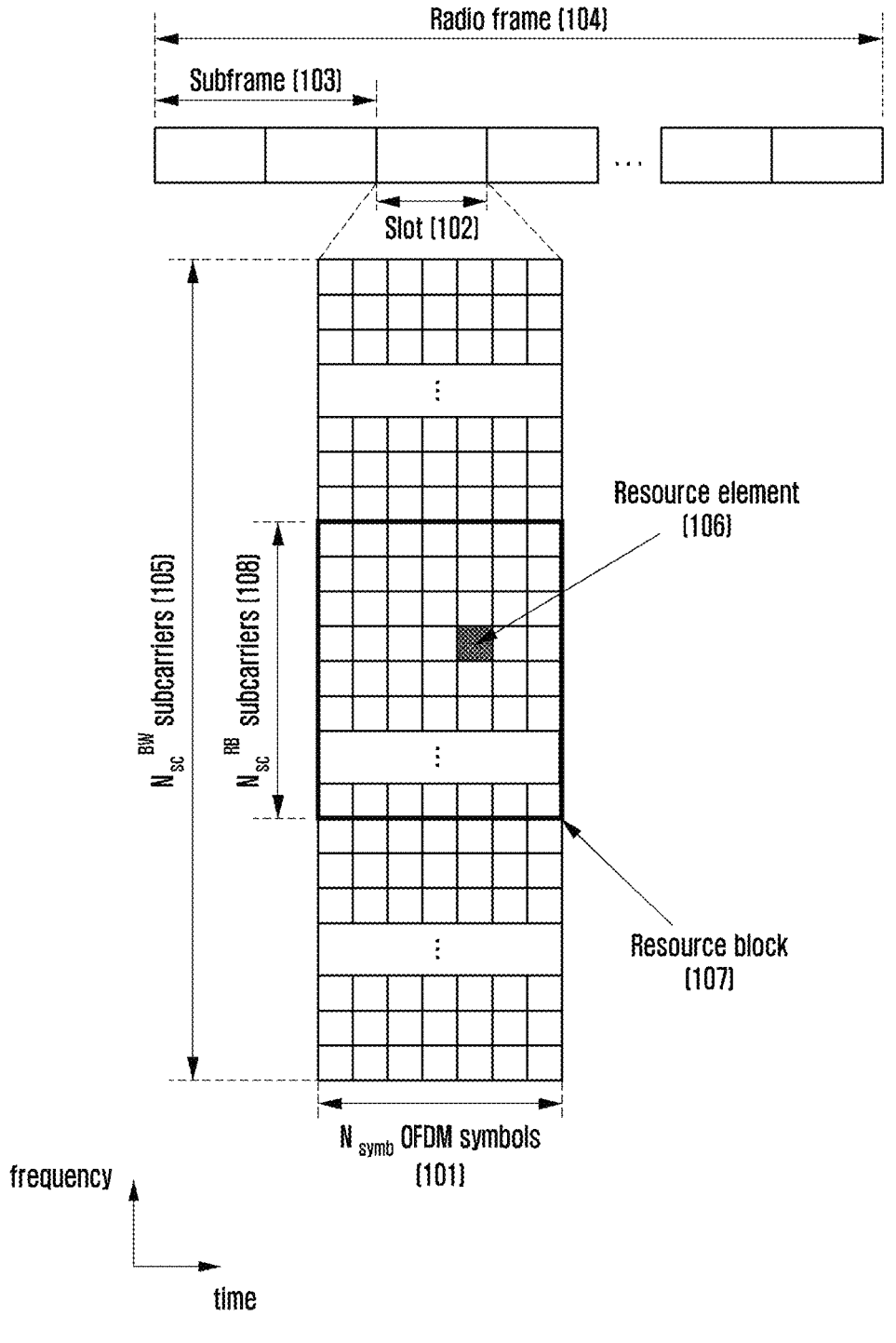
FIG. 1 illustrates an uplink/downlink time-frequency area transmission structure in an NR system according to an embodiment of disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. When it is determined that a detailed description of known functions or configurations related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification.

Various advantages and features of the disclosure and methods accomplishing the same will become apparent from the following detailed description of embodiments with reference to the accompanying drawings. However, the disclosure is not limited to the embodiments disclosed herein but may be implemented in various forms. The embodiments have made disclosure complete and are provided so that those skilled in the art can easily understand the scope of the disclosure. Therefore, the disclosure will be defined by the scope of the appended claims. Like reference numerals throughout the description denote like elements.

Hereinafter, embodiments of the disclosure will be described in detail with reference to the accompanying drawings.

In describing the embodiments of the disclosure, a description of technical contents which are well known in the art to which the disclosure belongs and are not directly connected to the disclosure will be omitted. Unnecessary decryptions will be omitted in order to provide the gist of the disclosure more clearly without obscuring the same.

For the same reason, some components are exaggerated, omitted, or schematically illustrated in the accompanying drawings. Further, the size of each component does not exactly reflect the real size. In each drawing, the same or corresponding components are denoted by the same reference numerals.

Various advantages and features of the disclosure and methods accomplishing the same will become apparent from the following detailed description of embodiments with reference to the accompanying drawings. However, the disclosure is not limited to the embodiments disclosed herein but may be implemented in various forms. The embodiments have made the disclosure complete and are provided so that those skilled in the art can easily understand the scope of the disclosure. Therefore, the disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses generate a means for performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including an instruction means for performing the functions described in block(s) of the flow charts. Since the computer program instructions may also be mounted on the computer or the other programmable data processing apparatuses, the instructions for performing a series of operation steps on the computer or the other programmable data processing apparatuses to generate processes executed by the computer and to execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "-unit" used in the embodiment means software or hardware components such as Field Programmable Gate Array (FPGA) and Application Specific Integrated Circuit (ASIC), and the "-unit" performs predetermined roles. However, the meaning of the "-unit" is not limited to software or hardware. The "-unit" may be configured to be in a storage medium that may be addressed and may also be configured to reproduce one or more processor. Accordingly, for example, the "-unit" includes components such as software components, object-oriented software components, class components, task components and processors, functions, attributes, procedures, subroutines, segments of program code, drivers, firmware, microcode, circuits, data, a database, data structures, tables, arrays, and variables. The functions provided in the components and the "-units" may be combined as a smaller number of components and the "-units" or may be further separated into additional components and "-units." In addition, the components and the "-units" may also be implemented to replicate one or more CPUs within a device or a security multimedia card. Further, in some embodiments, "-unit" may include one or more processors.

In the 5G system, a support for various services is considered compared to the existing 4G system. For example, the most representative services are an enhanced mobile broadband (eMBB) communication service, an ultra-reliable and low-latency communication (URLLC) service, a massive machine type communication (mMTC) service, an evolved multimedia broadcast/multicast service (eM-BMS), etc. Further, a system providing the URLLC service may be referred to as an URLLC system, a system providing the eMBB service may be referred to as an eMBB system, and the like. In addition, the terms "service" and "system" may be interchangeably used with each other.

As described above, in a communication system, a plurality of services may be provided to a user. In order to provide a plurality of such services to a user, there is a need for a method capable of providing each service suitable for characteristics within the same time interval and an apparatus using the same.

In a wireless communication system, for example, in an LTE system, an LTE-advanced (LTE-A) system or a 5G new radio (NR) system, a base station and a terminal may be configured such that the base station transmits downlink control information (DCI) to the terminal, the DCI including resource assignment information for transmission of a downlink signal to be transmitted via a physical downlink control channel (PDCCH), and thus the terminal receives at least one downlink signal of the DCI (for example, a channel-state information reference signal (CSI-RS)), a physical broadcast channel (PBCH), or a physical downlink shared channel (PDSCH).

For example, the base station transmits, in a subframe n, DCI indicating, to the terminal, reception of the PDSCH in the subframe n via the PDCCH, and upon reception of the DCI, the terminal receives the PDSCH in the subframe according to the received DCI. In addition, in the LTE, LTE-A, or NR system, the base station and the terminal may be configured such that the base station transmits DCI including uplink resource assignment information to the terminal via the PDCCH, and thus the terminal transmits at least one uplink signal of uplink control information (UCI) (for example, a sounding reference signal (SRS), UCI, or a physical random access channel (PRACH)) or a physical uplink shared channel (PUSCH) to the base station. For example, the terminal having received, from the base station via the PDCCH, uplink transmission configuration information (or uplink DCI or UL grant) in a subframe n may perform uplink data channel transmission (hereinafter, referred to as "PUSCH transmission") according to a predefined time (for example, n+4), a time configured via a higher-layer signal (for example, n+k), or uplink signal transmission time indicator information included in the uplink transmission configuration information.

In a case where configured downlink transmission is transmitted from the base station to the terminal via an unlicensed band, or configured uplink transmission is transmitted from the terminal to the base station via the unlicensed band, a transmission device (the base station or the terminal) may perform a channel access procedure or listen-before talk (LBT) procedure on the unlicensed band where a signal transmission is configured before or immediately before a start of the configured signal transmission. According to a result of performing the channel access procedure, when it is determined that the unlicensed band is in an idle state, the transmission device may access the unlicensed band and then perform the configured signal transmission. According to the result of the channel access procedure performed by the transmission device, when it is determined that the unlicensed band is not in the idle state or that the unlicensed band is in an occupied state, the transmission device fails to access the unlicensed band and thus fails to perform the configured signal transmission.

In general, in the channel access procedure via the unlicensed band where signal transmission is configured, the transmission device may determine the idle state of the unlicensed band by receiving a signal via the unlicensed band during a predetermined time or a time calculated according to a pre-defined rule (for example, a time calculated using a random value selected by the base station or the terminal), and comparing a strength of the received signal and a threshold value that is pre-defined or calculated by using a function of at least one parameter including a channel bandwidth, a bandwidth of a signal to be transmitted, the intensity of transmission power, or a beamwidth of a transmission signal. For example, when a strength of a signal received by the transmission device for 25 microseconds (μp) is less than −72 dBm, that is, a pre-defined threshold, the transmission device may determine that the unlicensed band is in the idle state and thus may perform the configured signal transmission. In this case, a maximum available time of the signal transmission may be limited according to a maximum channel occupancy time in the unlicensed band, which is defined according to each country or each region, or a type (for example, the base station, the terminal, a master device or a slave device) of the transmitting apparatus.

For example, in Japan, the base station or the terminal in 5 GHz of the unlicensed band may perform the channel access procedure and then may transmit, during a maximum of 4 milliseconds (ms), a signal by occupying a channel without additionally performing the channel access procedure. When the strength of the signal received by for 25 μs is greater than −72 dBm, which is the pre-defined threshold, the base station may determine that the unlicensed band is not in the idle state and transmits no signal.

In the 5G communication system, in order to provide various services and support a high data transmission rate, various technologies such as a technology capable of performing re-transmission in units of code block groups and transmitting an uplink signal without UL scheduling information have been introduced. Accordingly, to perform 5G communication via the unlicensed band, a more efficient channel access procedure based on various parameters is required.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE. In addition, 5G or NR communication standards are being established for a 5G wireless communication system.

In a wireless communication system including the 5G system, at least one of services including eMBB, mMTC, and URLLC may be provided to the terminal. The services may be provided to a same terminal during a same time interval. In an embodiment, the eMBB may be a service aiming at high-speed transmission of large-capacity data, the mMTC may be a service aiming at minimizing terminal power and connecting multiple terminals, and the URLLC may be a service aiming at high reliability and low latency, but the disclosure is not limited thereto. The above three services may be major scenarios in a system such as an LTE system or a 5G or new-radio/next-radio (NR) system beyond LTE.

In a case where a base station has scheduled data corresponding to an eMBB service for a terminal in a particular transmission time interval (TTI), when the situation in which URLLC data is to be transmitted in the TTI occurs, the base station does not transmit some of eMBB data in a frequency band in which the eMBB data has already been scheduled and transmitted, but may transmit the generated URLLC data in the frequency band. A terminal for which the eMBB has been scheduled and a terminal for which URLLC has been scheduled may be the same terminal or different terminals. In such a case, the possibility that the eMBB data may be damaged increases because there is a portion in which some of the already scheduled and transmitted eMBB data are not transmitted. Accordingly, in the above case, there is a need for a method of processing a signal received by the terminal for which eMBB has been scheduled or the terminal for which URLLC has been scheduled and a method of receiving a signal.

Hereinafter, the disclosure is described in detail with reference to the accompanying drawings. When it is determined that a detailed description for the function or configuration related to the disclosure may obscure the gist of the disclosure, the detailed description therefor will be omitted. Further, in the description of the disclosure, the following terminologies are defined in consideration of the functions in the disclosure and may be construed in different ways by the intention or practice of users and operators. Therefore, the definitions thereof should be construed based on the contents throughout the specification.

Hereinafter, a base station is an entity that assigns resources of a terminal, and may be at least one of an eNode B, a Node B, a BS, a wireless access unit, a BS controller, or a node on a network. A terminal may include a user equipment (UE), a mobile station (MS), a cellular phone, a smartphone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from a terminal to a base station. Furthermore, hereinafter, the LTE or LTE-A system is described as an example in the disclosure, but is not limited thereto, and embodiments of the disclosure may be applied to other communication systems having a similar technical background or channel type, and a 5th-generation mobile communication technology (5G or new-radio (NR)) developed beyond LTE-A can be included therein, for example. Furthermore, an embodiment of the disclosure may be applied to other communication systems through some modifications without greatly departing from the range of the disclosure based on a determination of those having skilled technical knowledge.

As a representative example of the broadband wireless communication systems, in an NR system, an orthogonal frequency-division multiplexing (OFDM) scheme has been adopted for a downlink (DL), and both the OFDM scheme and a single carrier frequency division multiple access (SC-FDMA) scheme have been adopted for an uplink (UL). The uplink indicates a radio link through which data or a control signal is transmitted from a terminal (a user equipment (UE) or a mobile station (MS)) to a base station (an eNode B or a BS), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

In a 5G system, flexibly defining and operating a frame structure may be required in consideration of various services and requirements. For example, services may have different subcarrier spacings according to the requirements. In a current 5G communication system, a scheme of supporting a plurality of subcarrier spacings may be determined by using [Equation 1] below:

$$\Delta f = f_0 2m. \qquad \text{[Equation 1]}$$

Here, $f_0$ indicates a default subcarrier spacing in a system, and m indicates a scaling factor that is an integer. For example, when $f_0$ is 15 kHz, a set of subcarrier spacings that the 5G communication system can have may include 3.75 kHz, 7.5 kHz, 15 kHz, 30 kHz, 60 kHz, 120 kHz, 240 kHz, 480 kHz, or the like. An available set of subcarrier spacings may vary according to a frequency band. For example, in a frequency band equal to or less than 6 GHz, 3.75 kHz, 7.5 kHz, 15 kHz, 30 kHz, and 60 kHz may be used, and in a frequency band equal to or greater than 6 GHz, 60 kHz, 120 kHz, and 240 kHz may be used.

The length of an OFDM symbol may vary depending on the subcarrier spacing constituting the OFDM symbol. This is because the subcarrier spacing and the OFDM symbol length are inversely proportional to each other, which is a characteristic feature of OFDM symbols. For example, when the subcarrier spacing doubles, the symbol length becomes half, and when the subcarrier spacing becomes half, the symbol length doubles.

The NR system adopts a hybrid automatic repeat request (HARQ) scheme such that, when decoding fails during the initial transmission, the corresponding data is retransmitted in the physical layer. According to the HARQ scheme, when a receiver fails to accurately decode data, the receiver transmits information indicating the decoding failure (negative acknowledgement (NACK)) to a transmitter such that the transmitter can retransmit the corresponding data in the physical layer. The receiver combines data retransmitted by the transmitter with data, which has previously failed to be decoded, thereby increasing the data receiving performance. In addition, when the receiver accurately decodes data, the receiver transmits information indicating the successful decoding (acknowledgement (ACK)) to the transmitter such that the transmitter can transmit new data.

FIG. 1 illustrates a basic structure of a time-frequency domain, which is a radio resource area in which a data or control channel is transmitted in up/downlink in an NR system or a system similar thereto according to an embodiment of the disclosure.

Referring to FIG. 1, a horizontal axis indicates a time domain, and a vertical axis indicates a frequency domain. A minimum transmission unit in the time domain is an OFDM symbol or DFT-s-OFDM symbol, and Nsymb OFDM symbols 101 gather to configure one slot 102. Here, the OFDM symbol represents a symbol used to transmit or receive a signal by using an OFDM multiplexing scheme, and the DFT-s-OFDM symbol represents a symbol used to transmit or receive a signal by using a DFT-s-OFDM multiplexing scheme or an SC-FDMA multiplexing scheme. Hereinafter, for convenience of description, the OFDM symbol and the DFT-s-OFDM symbol are not distinguished from each other and thus are collectively referred to as an OFDM symbol and will now be described with reference to reception or transmission of a downlink signal, but may also be applied to reception or transmission of an uplink signal.

When spacing between subcarriers is 15 kHz, one slot constitutes one subframe 103, and lengths of the slot and the subframe may each be 1 ms. The number of the slots constituting one subframe 103, and a length of the slot may vary according to spacing between subcarriers. For example, when spacing between subcarriers is 30 kHz, four slots gather to constitute one subframe 103. In this case, a length of the slot is 0.5 ms, and a length of the subframe is 1 ms. A radio frame 104 may be a time domain period composed of 10 subframes. A minimum transmission unit in the frequency domain is a subcarrier, and a transmission bandwidth of a whole system is composed of NSCBW subcarriers 105. However, these specific numerical values may be variably applied. For example, in the LTE system, spacing between subcarriers is 15 kHz, two slots gather to constitute one subframe 103, and in this case, a length of the slot is 0.5 ms and a length of the subframe is 1 ms.

A basic unit of a resource in the time-frequency domain is a resource element (RE) 106 and may be expressed as a symbol index and a subcarrier index. A resource block (RB or a physical resource block (PRB)) 107 may be defined as Nsymb consecutive OFDM symbols 101 in the time domain and NSCRB consecutive subcarriers 108 in the frequency domain. Therefore, one RB 107 in one slot may include Nsymb×NSCRB number of Res. In general, a minimum data assignment unit in the frequency domain is the RB 107. In the NR system, Nsymb=14 and NSCRB=12, and the number of RBs (NRB) may change according to a bandwidth of a system transmission band. In the LTE system, generally, Nsymb=7 and NSCRB=12, and NRB may change according to a bandwidth of a system transmission band.

Downlink control information may be transmitted within first N OFDM symbols in the subframe. Generally, N={1, 2, 3}, and the number of symbols in which the downlink control information is transmittable via a higher-layer signal may be configured for the terminal by the base station. In addition, according to the amount of control information to be transmitted in a current slot, the base station may change, for each slot, the number of symbols in which downlink control information is transmittable in a slot and may transfer information on the number of symbols to the terminal via a separate downlink control channel.

In the NR system, one component carrier (CC) or serving cell may include up to 250 RBs. Therefore, when a terminal always receives the entire serving cell bandwidth as in the LTE system, the power consumption of the terminal may be extreme. To solve this problem, a base station may configure one or more bandwidth parts (BWP) for the terminal, thus supporting the terminal in changing a reception area in the cell. In the NR system, the base station may configure an "initial BWP," which is the bandwidth of CORESET #0 (or a common search space (CSS)), for the terminal through a master information block (MIB). Subsequently, the base station may configure the initial BWP (the first BWP) for the terminal through radio resource control (RRC) signaling and may report at least one piece of BWP configuration information that may be indicated through downlink control information (DCI) later. The base station may report a BWP ID through DCI, thereby indicating a band to be used by the terminal. When the terminal fails to receive the DCI in the currently allocated BWP for a specified time or longer, the terminal returns to a "default BWP" and attempts to receive the DCI.

Figure 2:
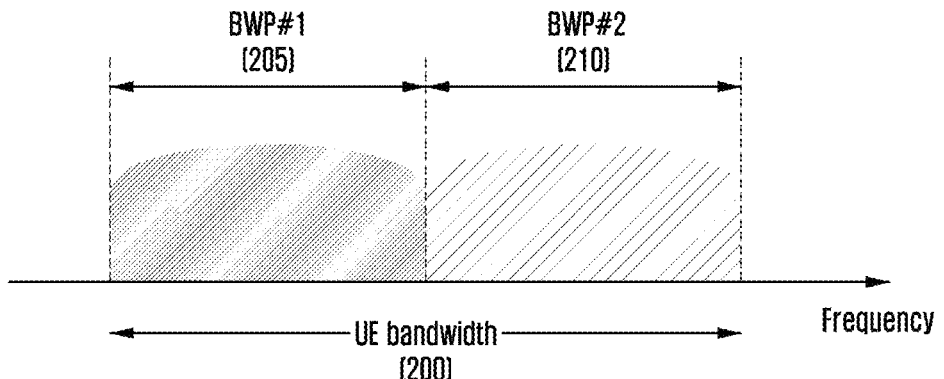
FIG. 2 illustrates an example of the configuration of a bandwidth part (BWP) in a wireless communication system according to an embodiment of the disclosure.

FIG. 2 illustrates an example of the configuration of a bandwidth part (BWP) in a wireless communication system according to an embodiment of the disclosure.

Referring to FIG. 2, FIG. 2 shows an example in which a terminal bandwidth 200 is configured with two bandwidth parts, that is, BWP #1 205 and BWP #2 210. A base station may configure one bandwidth part or a plurality of bandwidth parts for the terminal, and may configure, for each bandwidth part, information as shown in [Table 1].

TABLE 1

| BWP ::= | SEQUENCE { |
|---|---|
| bwp-Id | |
| BWP-Id, | |
| (bandwidth part identifier) | |
| locationAndBandwidth | INTEGER (1..65536), |
| (the location of the bandwidth part) | |
| subcarrierSpacing | ENUMERATED {n0, n1, n2, n3, |
| n4, n5}, | |
| (subcarrier spacing) | |
| cyclicPrefix | ENUMERATED { extended } |
| (cyclic prefix) | |
| } | |

The disclosure is not limited to the above-described example, and not only the configuration information but also various parameters related to the bandwidth part may be configured for the terminal. The information may be transferred from the base station to the terminal through higher-layer signaling, for example, radio resource control (RRC) signaling. Among one or multiple configured bandwidth parts, at least one bandwidth part may be activated. Information indicating whether to activate the configured bandwidth part may be semi-statically transferred from the base station to the terminal through RRC signaling, or may be dynamically transferred through a MAC control element (CE) or DCI.

According to an embodiment, the terminal before the RRC connection may receive the configuration of an initial bandwidth part (initial BWP) for initial access from the base station through a master information block (MIB). More specifically, the terminal may receive configuration information relating to a control resource set (CORESET) and a search space in which a PDCCH can be transmitted in order to receive system information (remaining system information (RMSI) or system information block 1 (SIB1)) required for initial access through the MIB in an initial access step. Each of the control resource set and the search space configured through the MIB may be considered as identity (ID) 0.

The base station may inform the terminal of configuration information such as frequency allocation information, time allocation information, and numerology for control resource set #0 through the MIB. Further, the base station may inform the terminal of configuration information relating to a monitoring period and occasion of control resource set #0, that is, configuration information relating to search space #0, through the MIB. The terminal may consider a frequency region configured as control resource set #0 acquired from the MIB as an initial bandwidth part for initial access. In this case, the ID of the initial bandwidth part may be considered as 0.

In relation to a method for configuring the bandwidth part, terminals before RRC-connected may receive configuration information of an initial bandwidth part through a master information block (MIB). More specifically, a control resource set (CORESET) for a downlink control channel through which downlink control information (DCI) for scheduling a system information block (SIB) can be transmitted may be configured for the terminal through an MIB of a physical broadcast channel (PBCH). The bandwidth of the control resource set configured by the MIB may be considered as an initial bandwidth part, and the terminal may receive a PDSCH through which the SIB is transmitted, through the configured initial bandwidth part. An initial bandwidth part may be used for other system information (OSI), paging, and random access in addition to the reception of the SIB.

In the following description, a synchronization signal (SS)/PBCH block in a next-generation mobile communication system (a 5G system or NR system) will be described.

An SS/PBCH block means a physical layer channel block including a primary SS (PSS), a secondary SS (SSS), and a PBCH. More specifically, the SS/PBCH block is defined below:

PSS: This indicates a signal serving as a reference for downlink time/frequency synchronization and provides a part of information of a cell ID;

SSS: This is a reference for downlink time/frequency synchronization and provides the remaining cell ID information which a PSS does not provide. Additionally, the SSS may serve as a reference signal for demodulating a PBCH;

PBCH: This provides necessary system information required for transmitting or receiving a data channel and a control channel by a terminal. The necessary system information may include search space-related control information indicating wireless resource mapping information of a control channel, and scheduling control information of a separate data channel for transmitting system information; and SS/PBCH block: An SS/PBCH block includes a combination of a PSS, an SSS, and a PBCH. One SS/PBCH block or a plurality of SS/PBCH blocks may be transmitted within 5 ms, and each of transmitted SS/PBCH blocks may be distinguished from each other by an index.

The terminal may detect the PSS and the SSS and decode the PBCH in the initial access stage. An MIB may be obtained from the PBCH and control resource set #0 may be configured from the MIB. The terminal may monitor control resource set #0 under the assumption that a selected SS/PBCH block and a demodulation reference signal (DMRS) transmitted on control resource set #0 are in a quasi-co-location (QCL). The terminal may receive system information from downlink control information transmitted on control resource set #0. The terminal may obtain, from the received system information, configuration information related to a random access channel (RACH) required for initial access. The terminal may transmit a physical RACH (PRACH) to the base station in consideration of a selected SS/PBCH index, and the base station having received the PRACH may obtain information on the SS/PBCH block index selected by the terminal. The base station may monitor a block which the terminal selects from among SS/PBCH blocks, and control resource set #0 corresponding to (or associated with) the selected SS/PBCH block.

In the following description, downlink control information (hereinafter, referred to as "DCI") in a next-generation mobile communication system (a 5G system or an NR system) will be described in detail.

In the next-generation mobile communication system (the 5G system or the NR system), scheduling information on uplink data (or a physical uplink data channel (a physical uplink shared channel (PUSCH))) or downlink data (or a physical downlink data channel (a physical downlink shared channel, (PDSCH))) can be transferred through DCI from a base station to a terminal. The terminal may monitor a fallback DCI format and a non-fallback DCI format for a PUSCH or a PDSCH. The fallback DCI format may include a fixed field pre-defined between the base station and the terminal, and the non-fallback DCI format may include a configurable field.

The DCI may be subjected to a channel coding and modulation procedure, and then transmitted through a physical downlink control channel (PDCCH). A cyclic redundancy check (CRC) may be attached to a DCI message payload, and the CRC may be scrambled by a radio network temporary identifier (RNTI) corresponding to the identity of the terminal. Different types of RNTIs can be used for scrambling the CRC, which is attached to the DCI message payload, according to the purpose of a DCI message, for example, UE-specific data transmission, a power control command, a random access response, or the like. That is, an RNTI is not explicitly transmitted, and may be included in a CRC calculation procedure so as to be transmitted. When a DCI message transmitted on a PDCCH is received, the terminal may identify a CRC by using an allocated RNTI. When a CRC identification result indicates matching of the RNTI, the terminal may identify that the message has been transmitted to the terminal.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying a slot format indicator (SFI) may be scrambled by an SFI-RNTI. DCI for notifying a transmission power control (TPC) may be scrambled by a TPC-RNTI. DCI for scheduling a UE-specific PDSCH or PUSCH may be scrambled by a cell RNTI (C-RNTI).

DCI format 0_0 may be used for fallback DCI for scheduling a PUSCH, and in this case, a CRC may be scrambled by a C-RNTI. In an embodiment, DCI format 0_0 having a CRC scrambled by a C-RNTI may include the following information as shown in [Table 2].

TABLE 2

| |
| --- |
| - Identifier for DCI formats (DCI format identifier) - [1] bit |
| - Frequency domain resource assignment - $[[\log_2 ( N_{RB}^{UL,BWP} (N_{RB}^{UL,BWP} + 1)/2)]]$ bits |
| - Time domain resource assignment - X bits |
| - Frequency hopping flag - 1 bit. |
| - Modulation and coding scheme - 5 bits |
| - New data indicator - 1 bit |
| - Redundancy version - 2 bits |
| - HARQ process number - 4 bits |
| - TPC command for scheduled PUSCH - [2] bits |
| - Uplink/supplementary uplink (UL/SUL) indicator - 0 or 1 bit |

DCI format 0_1 may be used for non-fallback DCI for scheduling a PUSCH, and in this case, a CRC may be scrambled by a C-RNTI. In an embodiment, DCI format 0_1 having a CRC scrambled by a C-RNTI may include the following information as shown in [Table 3].

TABLE 3

| |
| --- |
| - Carrier indicator - 0 or 3 bits |
| - UL/SUL indicator - 0 or 1 bit |
| - Identifier for DCI formats - [1] bits |
| - Bandwidth part indicator - 0, 1, or 2 bits |
| - Frequency domain resource assignment |
|     • For resource allocation type 0, $\lceil N_{RB}^{UL,BWP}/P \rceil$ bits |
|     • For resource allocation type 1, $\lceil \log_2 ( N_{RB}^{UL,BWP} (N_{RB}^{UL,BWP} + 1)/2) \rceil$ bits |
| - Time domain resource assignment -1, 2, 3, or 4 bits |
| - VRB-to-PRB mapping (mapping between virtual resource block and physical resource block) - 0 or 1 bit, only for resource allocation type 1. |
|     • 0 bit if only resource allocation type 0 is configured; |
|     • 1 bit otherwise. |
| - Frequency hopping flag - 0 or 1 bit, only for resource allocation type 1. |
|     • 0 bit if only resource allocation type 0 is configured; |
|     • 1 bit otherwise. |
| - Modulation and coding scheme - 5 bits |
| - New data indicator - 1 bit |
| - Redundancy version - 2 bits |
| - HARQ process number - 4 bits |
| - 1st downlink assignment index - 1 or 2 bits |
|     • 1 bit for semi-static HARQ-ACK codebook; |
|     • 2 bits for dynamic HARQ-ACK codebook with single HARQ-ACK codebook. |
| - 2nd downlink assignment index - 0 or 2 bits |
|     • 2 bits for dynamic HARQ-ACK codebook with two HARQ-ACK sub-codebooks; |
|     • 0 bit otherwise. |
| - TPC command for scheduled PUSCH - 2 bits |
| - SRS resource indicator - $\lceil \log_2 (\Sigma_{k-1}^{Lmax\Sigma} (N_{SRS_k})) \rceil$ or $\lceil \log_2 (N_{SRS}) \rceil$ bits |
|     • $\lceil \log_2 (\Sigma_{k-1}^{Lmax\Sigma} (N_{SRS_k})) \rceil$ bits for non-codebook based PUSCH transmission(if PUSCH transmission is not based on codebook); |
|     • $\lceil \log_2 (N_{SRS}) \rceil$ bits for codebook based PUSCH transmission(if PUSCH transmission is based on codebook). |
| - Precoding information and number of layers - up to 6 bits |
| - Antenna ports - up to 5 bits |
| - SRS request - 2 bits |
| - CSI request (wherein CSI indicates channel state information) - 0, 1, 2, 3, 4, 5, or 6 bits |
| - Code block group (CBG) transmission information - 0, 2, 4, 6, or 8 bits |
| - Phase tracking reference signal (PTRS)-Demodulation reference signal (DMRS) association - 0 or 2 bits. |
| - beta_offset indicator - 0 or 2 bits |
| - DMRS sequence initialization - 0 or 1 bit |

DCI format 1_0 may be used for fallback DCI for scheduling a PDSCH, and in this case, a CRC may be scrambled by a C-RNTI. In an embodiment, DCI format 1_0 having a CRC scrambled by a C-RNTI may include the following information as shown in [Table 4].

DCI format 1_1 may be used for non-fallback DCI for scheduling a PDSCH, and in this case, a CRC may be scrambled by a C-RNTI. In an embodiment, DCI format 1_1 having a CRC scrambled by a C-RNTI may include information as shown in [Table 6].

TABLE 6

- Carrier indicator - 0 or 3 bits
- Identifier for DCI formats - [1] bits
- Bandwidth part indicator - 0, 1, or 2 bits
- Frequency domain resource assignment
  - For resource allocation type 0, $\lceil N_{RB}^{DL,BWP}/P \rceil$ bits
  - For resource allocation type 1, $\lceil \log_2 ( N_{RB}^{DL,BWP} (N_{RB}^{DL,BWP} + 1)/2) \rceil$ bits
- Time domain resource assignment -1, 2, 3, or 4 bits
- VRB-to-PRB mapping - 0 or 1 bit, only for resource allocation type 1.
  - 0 bit if only resource allocation type 0 is configured;
  - 1 bit otherwise.
- Physical resource block (PRB) bundling size indicator - 0 or 1 bit
- Rate matching indicator - 0, 1, or 2 bits
- Zero power channel state information-reference signal (ZP CSI-RS) trigger - 0, 1, or 2 bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5, or 6 bits
- Transmission configuration indication - 0 or 3 bits
- SRS request - 2 bits
- Code block group (CBG) transmission information - 0, 2, 4, 6, or 8 bits
- CBG flushing out information - 0 or 1 bit
- DMRS sequence initialization - 1 bit

TABLE 4

- Identifier for DCI formats - [1] bit
- Frequency domain resource assignment - $[[\log_2 ( N_{RB}^{DL,BWP} (N_{RB}^{DL,BWP} + 1)/2)]]$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits Alternatively, DCI format 1_0 may be used for DCI for scheduling a PDSCH relating to an RAR message, and in this case, a CRC may be scrambled by an RA-RNTI. In an embodiment, DCI format 1_0 having a CRC scrambled by an RA-RNTI may include the following information as shown in [Table 5].

TABLE 5

Figure 3:
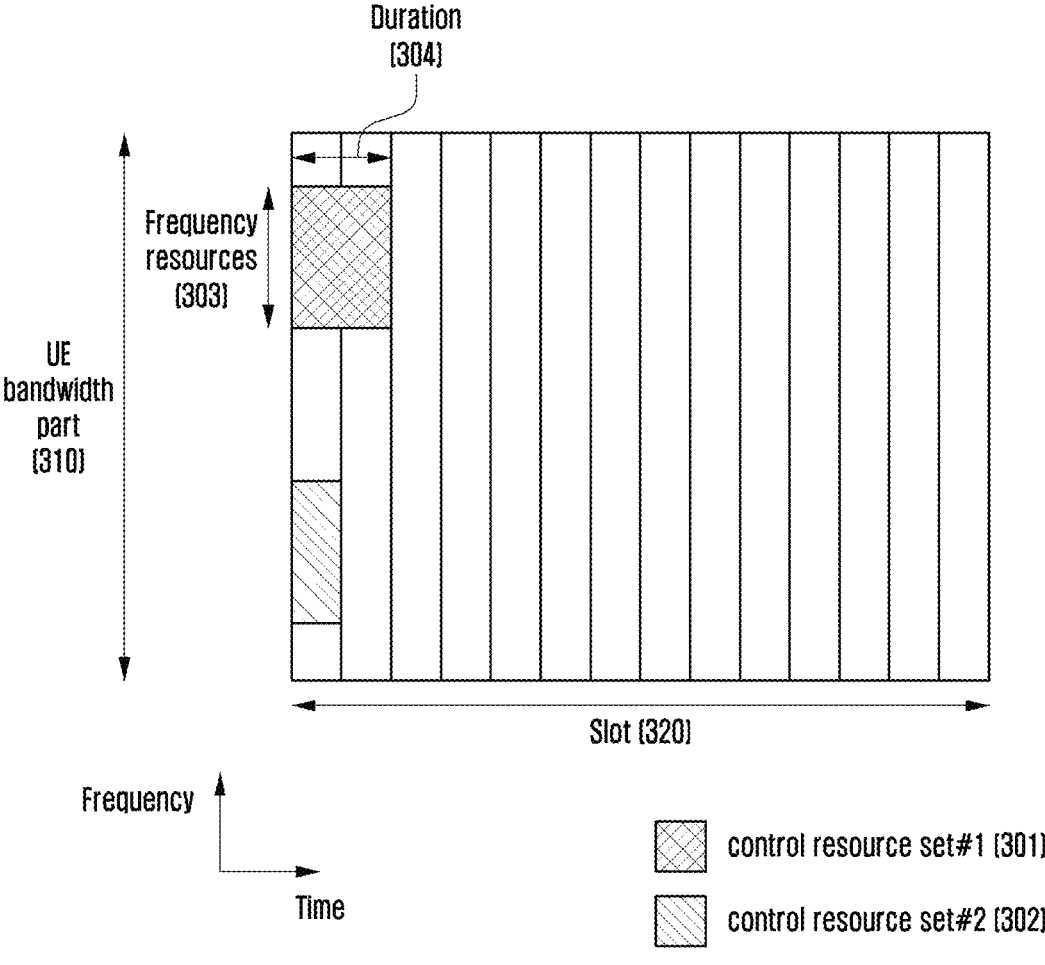
FIG. 3 illustrates an example of the configuration of a control resource set of a downlink control channel in a wireless communication system according to an embodiment of the disclosure.

- Frequency domain resource assignment - $[[\log_2 ( N_{RB}^{DL,BWP} (N_{RB}^{DL,BWP} + 1)/2)]]$ bits
- Time domain resource assignment - 4 bits
- VRB-to-PRB mapping - 1 bit
- Modulation and coding scheme - 5 bits
- TB scaling - 2 bits
- Reserved bits - 16 bits FIG. 3 illustrates an embodiment of a control resource set (CORESET), on which a downlink control channel is transmitted, in a 5G wireless communication system according to an embodiment of the disclosure.

Referring to FIG. 3, FIG. 3 shows an embodiment in which a terminal (UE) bandwidth part 3-10 is configured along a frequency axis, and two control resource sets (control resource set #1 301 and control resource set #2 302) are configured in one slot 320 along a time axis. The control resource sets 301 and 302 may be configured in a particular frequency resource 303 in the terminal bandwidth part 310 along the frequency axis. In the control resource sets 301 and 302, one OFDM symbol or multiple OFDM symbols may be configured along the time axis, and the configured OFDM symbol or symbols may be defined as a control resource set duration 304. Referring to FIG. 3, control resource set #1 301 may be configured to have a control resource set duration of two symbols, and control resource set #2 302 may be configured to have a control resource set duration of one symbol.

A control resource set in the above-described next-generation mobile communication system (the 5G system or the NR system) may be configured for a terminal by a base station via higher-layer signaling (for example, system information, master information block (MIB), and radio resource control (RRC) signaling). Configuring a control resource set for a terminal means providing information such as a control resource set identifier (identity), the frequency location of the control resource set, the symbol length of the control resource set, etc. For example, the configuration of the control resource set may include the following information as shown in [Table 7].

TABLE 7

```
ControlResourceSet ::=                    SEQUENCE {
  -- Corresponds to L1 parameter 'CORESET-ID'
  controlResourceSetId
  ControlResourceSetId,
  (control resource set identifier(Identity))
  frequencyDomainResources         BIT STRING (SIZE
(45)),
  (frequency-axis resource assignment information)
  duration
  INTEGER (1..maxCoReSetDuration),
  (time-axis resource assignment information)
  cce-REG-MappingType
  CHOICE {
  (CCE-to-REG mapping scheme)
      interleaved
      SEQUENCE {
          reg-BundleSize
      ENUMERATED {n2, n3, n6},
      (REG bundle size)
          precoderGranularity
      ENUMERATED {sameAsREG-bundle, allContiguousRBs},
          interleaverSize
      ENUMERATED {n2, n3, n6}
          (interleaver size)
          shiftIndex
      INTEGER(0..maxNrofPhysicalResourceBlocks−1)
          (interleaver shift)
  },
  nonInterleaved                              NULL
  },
  tci-StatesPDCCH
  SEQUENCE(SIZE (1..maxNrofTCI-StatesPDCCH)) OF TCI-StateId
          OPTIONAL,
  (QCL configuration information)
  tci-PresentInDCI
  ENUMERATED {enabled}
}
```

The tci-StatesPDCCH (hereinafter, referred to as a "TCI state") configuration information shown in [Table 7] may include information on the index or indices of one synchronization signal (SS)/physical broadcast channel (PBCH) block or multiple SS/PBCH blocks which are in a quasi-co-located (QCL) relationship with a demodulation reference signal (DMRS) transmitted on a corresponding control resource set, or information on the index of a channel state information reference signal (CSI-RS). The frequencyDomainResources configuration information configures a frequency resource of the corresponding CORESET as a bitmap, wherein each bit indicates a group of non-overlapping six PRBs. The first group means a group of six PRBs having the first PRB index of $6 \cdot [N_{BWP}^{start}/6]$, wherein $N_{BWP}^{start}$ indicates a start point of a BWP. The most significant bit of the bitmap indicates the first group and the bits are configured in an ascending order.

In the wireless communication system, different antenna ports (which can be replaced with one or more channels, signals, or a combination thereof, but is collectively referred to as "different antenna ports" for convenience of further description in the disclosure) may be associated with each other according to QCL configuration as shown in [Table 8] below.

TABLE 8

```
QCL-Info ::=        SEQUENCE
  cell              ServCellIndex (an index of a serving
cell in which QCL reference RS is transmitted)
```

TABLE 8-continued

```
  bwp-ID              BWP-Id (an index of a bandwidth part
in which QCL reference RS is transmitted)
  referenceSignal     CHOICE { (an indicator indicating one of CSI-
RS and SS/PBCH as a QCL reference RS)
          csi-rs          NZP-CSI-RS-ResourceId,
  s         sb            SSB-Index
  },
  qcl-Type              ENUMERATED {typeA, typeB,
typeC, type D}, (QCL type indicator)
  ...
}
```

Specifically, in QCL configuration, two different antenna ports can be associated with each other based on relationships between a (QCL) target antenna port and a (QCL) reference antenna port. The terminal may apply (or assume) all or some of channel statistical characteristics measured by the reference antenna port (for example, a large-scale parameter of a channel, such as a Doppler shift, a Doppler spread, an average delay, a delay spread, an average gain, a spatial Rx (or Tx) parameter, a reception space filter parameter of the terminal, or a transmission space filter parameter of the terminal) at the time of target antenna port reception. In the description above, the target antenna means an antenna port for transmitting a channel or a signal configured by higher-layer configuration including the QCL configuration, or an antenna port for transmitting a channel or a signal for transmitting a channel or a signal to which a TCI state indicating the QCL configuration is applied. The reference antenna port means an antenna port for transmitting a channel or a signal indicated (or specified) by a referenceSignal parameter in the QCL configuration.

Specially, channel statistical characteristics specified by the QCL configuration (or indicated by the parameter qcl-Type in the QCL configuration) may be classified as below according to a QCL type:

(1) "QCL-TypeA": {Doppler shift, Doppler spread, average delay, delay spread};

(2) "QCL-TypeB": {Doppler shift, Doppler spread};

(3) "QCL-TypeC": {Doppler shift, average delay}; and (4) "QCL-TypeD": {Spatial Rx parameter}.

In this case, the QCL type is not limited to the four types above, but all possible combinations are not enumerated in order not to obscure the gist of the description. QCL-TypeA corresponds to a QCL type used in a case where the bandwidth and the transport interval of the target antenna port are more sufficient than those of the reference antenna port (that is, in a case where the number of samples and the transmission bandwidth/time of the target antenna port are greater than the number of samples and the transmission bandwidth/time of the reference antenna port in both the frequency axis and the time axis), and thus all statistical characteristics measurable in the frequency axis and the time axis can be referred to. QCL-TypeB corresponds to a QCL type used in a case where the bandwidth of the target antenna port is sufficient to measure statistical characteristics, that is, the Doppler shift and Doppler spread parameters, measurable in the frequency.

QCL-TypeC corresponds to a QCL type used in a case where the bandwidth and the transport interval of the target antenna port are insufficient to measure second-order statistics, that is, the Doppler spread and delay spread parameters, and thus only first-order statistics, that is, only the Doppler shift and average delay parameters, can be referred to. QCL-TypeD corresponds to a QCL type configured when spatial reception filter values used at the time of reference antenna port reception can be used at the time of target antenna port reception.

The base station may configure or indicate the maximum two QCL configurations for or to the target antenna port through TCI state configuration as shown in [Table 9] below.

TABLE 9

| TCI-State ::= | SEQUENCE { |
|---|---|
| tci-StateId | TCI-StateId, (TCI state indicator) |
| qcl-Type1 | QCL-Info, (the first QCL configuration for the target antenna port to which the corresponding TCI state is applied) |
| qcl-Type2 | QCL-Info (the second QCL configuration for the target antenna port to which the corresponding TCI state is applied) |
| | OPTIONAL,  --Need R |
| ... | |
| } | |

The first QCL configuration among two QCL configurations included in one TCI state configuration may be configured to be one of QCL-TypeA, QCL-TypeB, and QCL-TypeC. In this case, the configurable QCL type is specified by the types of the target antenna port and the reference antenna port and will be described in detail below. In addition, the second QCL configuration among two QCL configurations included in the TCI state configuration may be configured to be QCL-TypeD and can be omitted in some cases.

Tables 10 to 14 show valid TCI state configurations according to the type of the target antenna port.

Table 10 shows valid TCI state configurations in a case where the target antenna port is a CSI-RS for tracking (TRS). The TRS means an NZP CSI-RS, for which no repetition parameter is configured and trs-Info is configured to have a value of "true," among CSI-RSs. In Table 10, when configuration 3 is configured, the target antenna port can be used for an aperiodic TRS.

TABLE 10

Valid TCI state configurations when target antenna port is CSI-RS for tracking (TRS)

| Valid TCI state configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 11 shows valid TCI state configurations in a case where the target antenna port is a CSI-RS for CSI. The CSI-RS means an NZP CSI-RS, for which neither repetition parameter is configured nor trs-Info is configured to have a value of "true," among CSI-RSs.

TABLE 11

Valid TCI state configurations when target antenna port is CSI-RS for CSI

| Valid TCI state configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 12 shows valid TCI state configurations in a case where the target antenna port is a CSI-RS for beam management (BM) (that is identical to a CSI-RS for L1 RSRP reporting). The CSI-RS of BM means an NZP CSI-RS for which a repetition parameter is configured and has a value of "on" or "off" and no trs-info is configured to have a value of "true," among CSI-RSs.

TABLE 12

Valid TCI state configurations when target antenna port is CSI-RS for BM (for L1 RSRP reporting)

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 13 shows valid TCI state configurations when the target antenna port is a PDCCH DMRS.

TABLE 13

Valid TCI state configurations when target antenna port is PDCCH DMRS

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 14 shows valid TCI state configurations when the target antenna port is a PDSCH DMRS.

TABLE 14

Valid TCI state configurations when target antenna port is PDSCH DMRS

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration scheme according to Tables 9ba to 9be, the target antenna port and the reference antenna port at each stage are configured and managed such as "SSB" "TRS" "CSI-RS for CSI, CSI-RS for BM, PDCCH DMRS, or PDSCH DMRS." Accordingly, the statistical characteristics measurable from the SSB and the TRS are associated with the antenna ports, and thus a reception operation by the terminal can be assisted.

Figure 4:
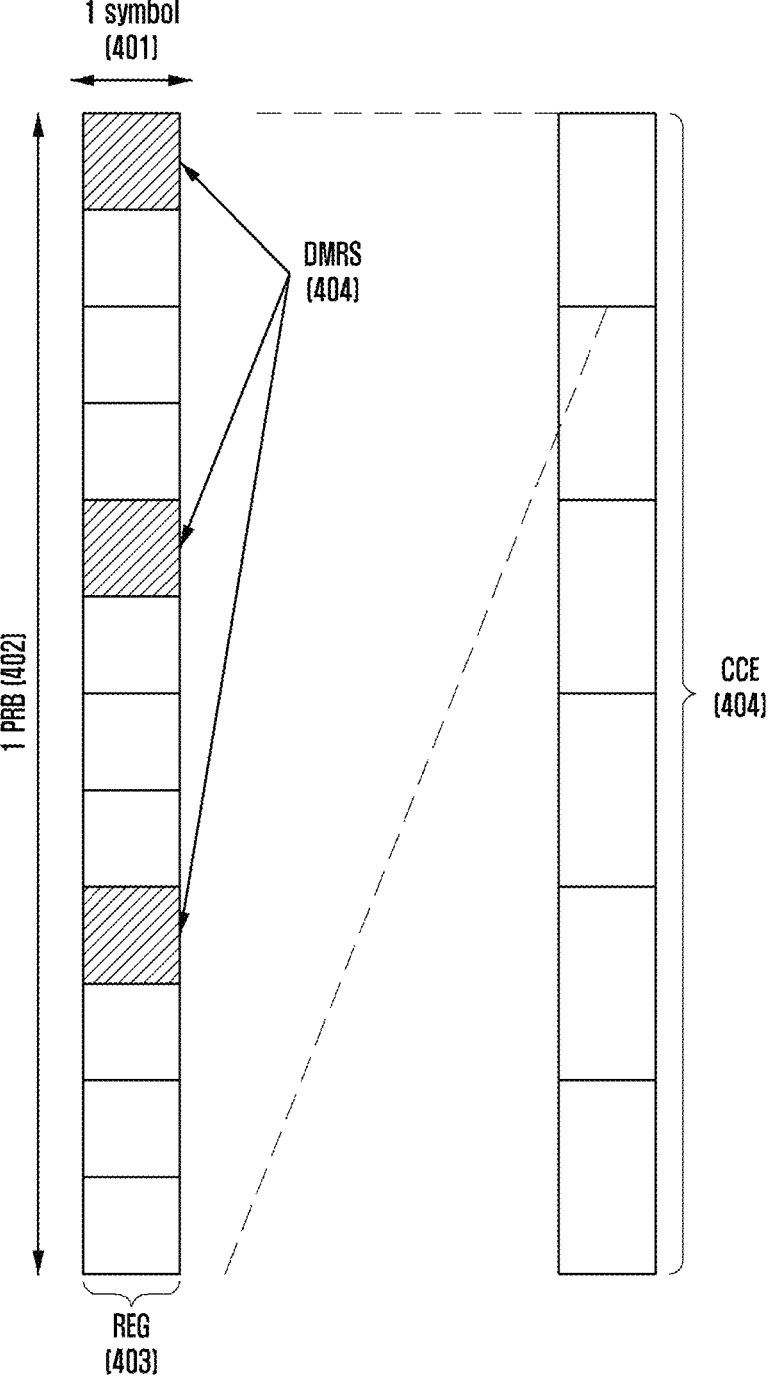
FIG. 4 illustrates a structure of a downlink control channel in an NR system according to an embodiment of the disclosure.

FIG. 4 illustrates a structure of a downlink control channel in a wireless communication system according to an embodiment of the disclosure. That is, FIG. 4 illustrates an example of a basic unit of a time and a frequency resource included in a downlink control channel which can be used by 5G according to an embodiment of the disclosure.

Referring to FIG. 4, the basic unit of a time and a frequency resource included in the control channel may be defined by a resource element group (REG) 403. The REG 403 may be defined as one OFDM symbol 401 on the time axis and one physical resource block (PRB) 402 on the frequency axis, that is, as 12 subcarriers. It is possible to configure a downlink control channel allocation unit by concatenating the REG 403.

As illustrated in FIG. 4, when the basic unit in which the downlink control channel is allocated in the 5G system is a control channel element (CCE) 404, one CCE 404 may include a plurality of REGs 403. For example, the REG 403 in FIG. 4 may include 12 Res, and when one CCE 404 includes six REGs 403, one CCE 404 may include 72 Res. When a downlink control resource set is configured, the corresponding resource set may include a plurality of CCEs 404, and a particular downlink control channel may be mapped to one or a plurality of CCEs 404 according to an aggregation level (AL) within the control resource set and may then be transmitted. The CCEs 404 within the control resource set may be distinguished by numbers, and the numbers of the CCEs 404 may be assigned according to a logical mapping scheme.

The basic unit of the downlink control channel illustrated in FIG. 4, that is, the REG 403, may include all Res to which the DCI is mapped and the region to which a DMRS 405, which is a reference signal for decoding the Res, is mapped. As illustrated in FIG. 4, three DMRSs 405 may be transmitted within one REG 403. The number of CCEs required to transmit the PDCCH may be 1, 2, 4, 8, or 16 according to the aggregation level (AL), and the different number of CCEs may be used to implement link adaptation of the downlink control channel. For example, when AL=L, one downlink control channel may be transmitted through L CCEs.

The terminal is required to detect a signal in the state in which the terminal is not aware of information on the downlink control channel, and a search space indicating a set of CCEs may be defined for blind decoding. The search space is a set of candidate control channels including CCEs for which the terminal may attempt decoding at the given aggregation level. There are several aggregation levels at which a set of CCEs is configured by 1, 2, 4, 8, and 16 CCEs, so that the terminal has a plurality of search spaces. The search space set may be defined as a set of search spaces at all configured aggregation levels.

The search spaces may be classified into a common search space and a terminal (UE)-specific search space. According to an embodiment of the disclosure, terminals in a predetermined group or all terminals may search for a common search space of the PDCCH in order to receive cell-common control information such as dynamic scheduling of system information or paging messages.

For example, the terminal may receive PDSCH scheduling allocation information for transmission of an SIB including information on the service provider of a cell by searching a common search space of the PDCCH. In a case of the common search space, terminals in a predetermined group or all terminals may receive the PDCCH, so that the common search space may be defined as a set of pre-arranged CCEs. Scheduling allocation information of the terminal-specific PDSCH or PUSCH may be received by searching a terminal-specific search space of the PDCCH. The terminal-specific search space may be defined in a terminal-specific manner as a terminal identity and a function of various system parameters.

In the 5G system, parameters for the PDCCH search space may be configured for the terminal by the base station via higher-layer signaling (for example, SIB, MIB, or RRC signaling). For example, the base station may configure, for the terminal, the number of PDCCH candidates at each aggregation level L, a monitoring period of the search space, a monitoring occasion in units of symbols within the slot for the search space, a search space type (a common search space or a terminal-specific search space), a combination of a DCI format and an RNTI to be monitored in the corresponding search space, a control resource set index for monitoring the search space, and the like. For example, the above-described configuration may include the following information as shown in [Table 15].

TABLE 15

```
SearchSpace ::=
    SEQUENCE {
    -- Identity of the search space. SearchSpaceId = 0 identifies the SearchSpace
configured via PBCH (MIB) or ServingCellConfigCommon.
    searchSpaceId                                    SearchSpaceId,
    (search space identifier)
    controlResourceSetId                             ControlResourceSetId,
    (control resource set identifier)
    monitoringSlotPeriodicityAndOffset               CHOICE {
    (monitoring slot level period)
        sl1
    NULL,
        sl2
    INTEGER (0..1),
        sl4
    INTEGER (0..3),
        sl5
    INTEGER (0..4),
        sl8
    INTEGER (0..7),
```

TABLE 15-continued

```
    sl10
 INTEGER (0..9),
    sl16
 INTEGER (0..15),
    sl20
 INTEGER (0..19)
 }
                                        OPTIONAL,
 duration(monitoring duration)          INTEGER (2..2559)
  monitoringSymbolsWithinSlot
  BIT STRING (SIZE (14))
                                        OPTIONAL,
 (monitoring symbols in slot)
  nrofCandidates
  SEQUENCE {
 (the number of PDCCH candidate groups for each aggregation level)
     aggregationLevel1
  ENUMERATED {n0, n1, n2, n3, n4, n5, n6, n8},
     aggregationLevel2
  ENUMERATED {n0, n1, n2, n3, n4, n5, n6, n8},
     aggregationLevel4
  ENUMERATED {n0, n1, n2, n3, n4, n5, n6, n8},
     aggregationLevel8
  ENUMERATED {n0, n1, n2, n3, n4, n5, n6, n8},
     aggregationLevel16
  ENUMERATED {n0, n1, n2, n3, n4, n5, n6, n8}
  },
  searchSpaceType
  CHOICE {
 (search space type)
     -- Configures this search space as common search space (CSS) and
 DCI formats to monitor.
     Common
  SEQUENCE {
 (common search space)
  }
     ue-Specific
  SEQUENCE {
 (UE-specific search space)
       -- Indicates whether the UE monitors in this USS for DCI
 formats 0-0 and 1-0 or for formats 0-1 and 1-1.
     Formats
     ENUMERATED {formats0-0-And-1-0, formats0-1-And-1-1},
        ...
  }
```

The base station may configure one or a plurality of search space sets for the terminal according to the configuration information. In an embodiment of the disclosure, the base station may configure search space set 1 and search space 2 for the terminal, and the configuration may be performed such that DCI format A scrambled by an X-RNTI in search space set 1 is monitored in the common search space and DCI format B scrambled by a Y-RNTI in search space set 2 is monitored in the terminal-specific search space.

According to the configuration information, there may be one or a plurality of search space sets in the common search space or the terminal-specific search space. For example, search space set #1 and search space set #2 may be configured as common search spaces, and search space set #3 and search space set #4 may be configured as terminal-specific search spaces.

The common search spaces may be classified into a particular type of search space sets according to the purpose thereof. RNTIs to be monitored may be different for each determined search space set type. For example, the common search space types, the purposes, and the RNTIs to be monitored may be classified as shown in Table 16 below.

TABLE 16

| Search space type | Purpose | RNTI |
|---|---|---|
| Type0 CSS | PDCCH transmission for SIB scheduling | SI-RNTI |
| Type0A CSS | PDCCH transmission for SI scheduling (SIB2, etc.) other than SIB1 | SI-RNTI |
| Type1 CSS | PDCCH transmission for random-access response (RAR) scheduling, Msg3 retransmission scheduling, and Msg4 scheduling | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | PDCCH transmission for data scheduling in case of Pcell | C-RNTI, MCS-C-RNTI, CS-RNTI |

In a common search space, the following combinations of a DCI format and a RNTI may be monitored, but is not limited to the examples below:

DCI format 0_0/1_0 with CRC scrambled by C-RNTI, CS-RNTI, SP-CSI-RNTI, RA-RNTI, TC-RNTI, P-RNTI, SI-RNTI;

DCI format 2_0 with CRC scrambled by SFI-RNTI;

DCI format 2_1 with CRC scrambled by INT-RNTI;

DCI format 2_2 with CRC scrambled by TPC-PUSCH-RNTI, TPC-PUCCH-RNTI; and

DCI format 2_3 with CRC scrambled by TPC-SRS-RNTI.

In a terminal-specific search space, the following combinations of a DCI format and a RNTI may be monitored, but is not limited to the examples below:

DCI format 0_0/1_0 with CRC scrambled by C-RNTI, CS-RNTI, TC-RNTI; and

DCI format 1_0/1_1 with CRC scrambled by C-RNTI, CS-RNTI, TC-RNTI.

The described types of RNTIs may follow the definitions and purposes below:

Cell RNTI (C-RNTI): Terminal-specific PDSCH scheduling purpose;

Temporary Cell RNTI (TC-RNTI): Terminal-specific PDSCH scheduling purpose;

Configured Scheduling RNTI (CS-RNTI): Semi-statically configured terminal-specific PDSCH scheduling purpose;

Random access RNTI (RA-RNTI): The purpose of scheduling a PDSCH in a random access stage;

Paging RNTI (P-RNTI): The purpose of scheduling a PDSCH on which paging is transmitted;

System information RNTI (SI-RNTI): The purpose of scheduling a PDSCH on which system information is transmitted;

Interruption RNTI (INT-RNTI): The purpose of notifying of whether a PDSCH is punctured;

Transmit power control for PUSCH RNTI (TPC-PUSCH-RNTI): The purpose of indicating a power control command for a PUSCH;

Transmit power control for PUCCH RNTI (TPC-PUCCH-RNTI): The purpose of indicating a power control command for a PUCCH; and transmit power control for SRS RNTI (TPC-SRS-RNTI): The purpose of indicating a power control command for an SRS.

In an embodiment, the described DCI formats may follow the definitions in [Table 17] below.

TABLE 17

| DCI format | Usage |
| --- | --- |
| 0_0 | Scheduling of a PUSCH in one cell |
| 0_1 | Scheduling of a PUSCH in one cell |
| 1_0 | Scheduling of a PDSCH in one cell |
| 1_1 | Scheduling of a PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, a search space of aggregation level L in control resource set p and search space set s may be expressed as in the following equation:

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 2]}$$

L: Aggregation level;

$n_{CI}$: Carrier index;

$N_{CCE,p}$: The total number of CCEs existing in control resource set p;

$n_{s,f}^{\mu}$: Slot index;

$M_{p,s,max}^{(L)}$: The number of PDCCH candidate groups of aggregation level L;

$m_{snCI}=0, \ldots, M_{p,s,max}^{(L)}-1$: The index of PDCCH candidate groups of aggregation level L;

$i=0, \ldots, L-1$ $$Y_{p,n_{s,f}^{\mu}} = (A_p \cdot Y_{p,n_{s,f}^{\mu}-1}) \bmod D, Y_{p,-1} = n_{RNTI} \neq 0, A_0 = 39827,$$
$$A_1 = 39829, A_2 = 39839, D = 65537; \text{and}$$

$n_{RNTI}$: Terminal identifier.

In a case of a common search space, $Y\_(p,n\mu s,f)$ may be 0.

In a case of a terminal-specific search space, $Y\_(p,n\mu s,f)$ may be changed according to a time index and the identity (a C-RNTI or an ID configured for the terminal by the base station) of a terminal.

According to an embodiment of the disclosure, a plurality of search space sets may be configured as different parameters (for example, the parameters in [Table 10]) in the 5G system. Accordingly, the search space set that the terminal monitors may be different each time. For example, when search space set #1 is configured in an X-slot period, search space set #2 is configured in a Y-slot period, and X and Y are different from each other, the terminal may monitor both search space set #1 and search space set #2 in a particular slot, and may monitor only one of search space set #1 and search space set #2 in another particular slot.

Meanwhile, the uplink/downlink HARQ in the NR system adopts an asynchronous HARQ scheme in which the data retransmission time point is not fixed. By taking the downlink as an example, when a base station has received a feedback of HARQ NACK from the terminal in response to initially transmitted data, the base station freely determines the retransmission data transmission time point according to a scheduling operation. After buffering data that has been determined as an error as a result of decoding of reception data for an HARQ operation, the terminal may perform combining with the next retransmission data. HARQ ACK/NACK information of the PDSCH transmitted in a subframe n-k may be transmitted from the terminal to the base station via the PUCCH or the PUSCH in a subframe n.

In the 5G communication system such as the NR system, a k value may be included in DCI for indicating or scheduling reception of the PDSCH transmitted in the subframe n-k and then transmitted or may be configured for the terminal via a higher-layer signal. In this case, the base station may configure one or more k values via a higher-layer signal, and may indicate a particular k value via the DCI, wherein k may be determined based on HARQ-ACK processing capacity of the terminal, i.e., a minimum time required for the terminal to receive the PDSCH and then to generate and report HARQ-ACK with respect to the PDSCH. In addition, before the k value is configured for the terminal, the terminal may use a pre-defined value or a default value.

Next, the description of a resource area in which a data channel is transmitted in a 5G communication system will be made below.

FIG. 5 illustrates a resource area in which a data channel is transmitted in a 5G communication system according to an embodiment of disclosure. In a downlink control channel (hereinafter, referred to as a "PDCCH") area (hereinafter, referred to as a "control resource set (CORESET)" or a "search space (SS)") configured by the base station through a higher-layer signal, the terminal monitors or searches for a PDCCH 510. In this case, the downlink control channel area may include time-domain information 514 and frequency-domain information 512, the time-domain information 514 may be configured in units of symbols, and the frequency-domain information 512 may be configured in units of RBs or RB groups. When the terminal detects the PDCCH 510 in a slot i 500, the terminal acquires downlink control information (DCI) transmitted via the detected PDCCH 510.

The terminal may acquire scheduling information relating to a downlink data channel or an uplink data channel from the received downlink control information (DCI). In other words, the DCI may include at least information on a resource area (or a PDSCH transmission area) in which the terminal is to receive a downlink data channel (hereinafter, referred to as a "PDSCH") transmitted from the base station, or information on a resource area that is allocated to the terminal, by the base station, for transmission of an uplink data channel (a PUSCH). The case in which uplink data channel (PUSCH) transmission is scheduled for the terminal will be described as follows. The terminal that received DCI may acquire, from the DCI, a slot index or offset information K relating to reception of the PUSCH, and may determine a PUSCH transmission slot index.

For example, the terminal may determine that the terminal is scheduled to transmit the PUSCH in a slot i+K 505, based on the offset information K, with reference to the slot index I 500 in which the PDCCH 510 is received. In this case, the terminal may also determine the slot i+K 505 or a PUSCH start symbol or time in the slot i+K by using the received offset information K, with reference to the received CORESET in which the PDCCH 510 is received. In addition, the terminal may acquire, from the DCI, information relating to a PUSCH transmission time-frequency resource area 540 in groups, or may be information indicating absolute time information. In this case, the PUSCH transmission time resource area information 525 may be expressed as a combination of a PUSCH transmission start time or symbol and a PUSCH length, and a PUSCH end time or symbol, and may be included in the DCI as a field or value. Here, the PUSCH transmission time resource area information 525 may be included in the DCI as a field or a value expressing each of the PUSCH transmission start time or symbol and the PUSCH length, and the PUSCH end time or symbol. The terminal may transmit the PUSCH in a PUSCH transmission resource area 540 determined based on the DCI.

The description of a frequency-domain resource allocation scheme for a data channel in the 5G communication system will be made below.

Next, a scheme of configuring a beam to transmit control information and data to the terminal by the base station will be described. For convenience of description in the disclosure, a process of transmitting control information via a PDCCH may be represented in that a PDCCH is transmitted, and a process of transmitting data via a PDSCH may be represented in that a PDSCH is transmitted.

First, a beam configuration scheme will be described.

Figure 6:
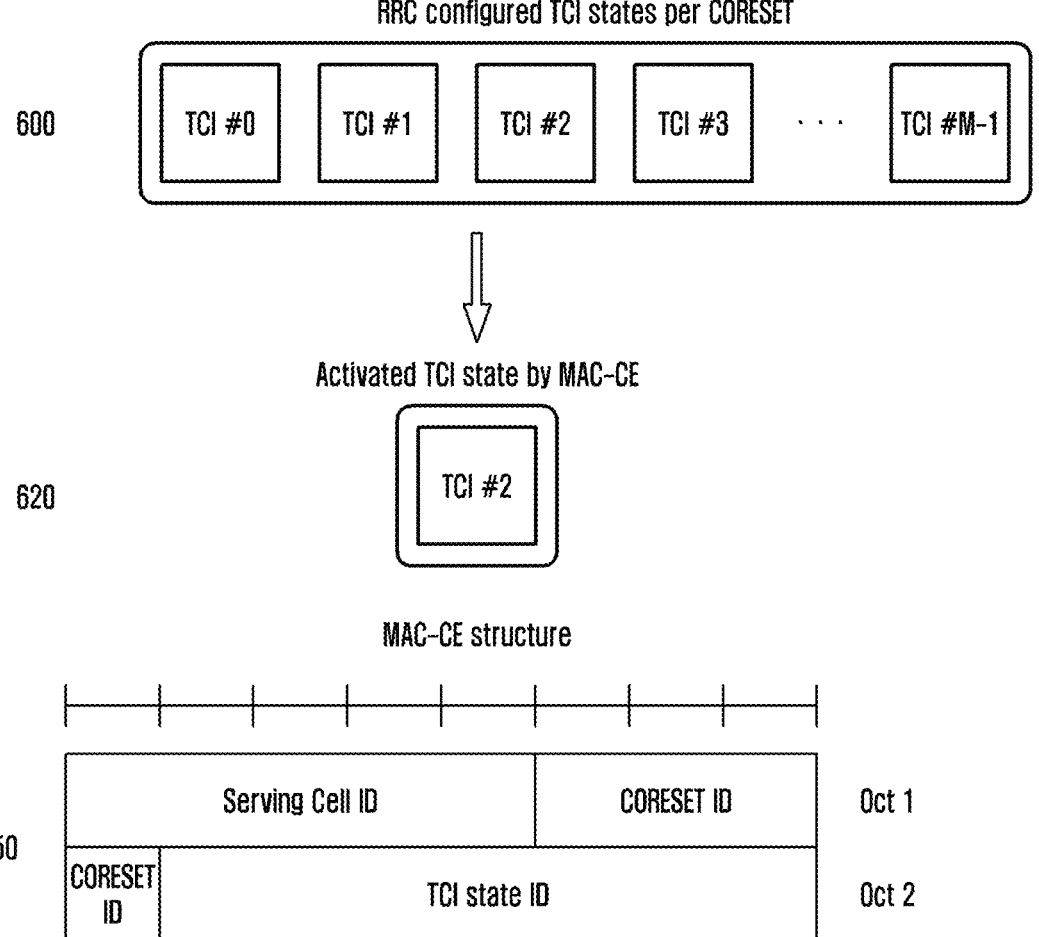
FIG. 6 illustrates a process of beam configuration and activation of a PDCCH according to an embodiment of the disclosure.

FIG. 6 illustrates a process of beam configuration and activation for a PDCCH according to an embodiment of the disclosure. First, a list of TCI states may be indicated for each CORESET through a higher-layer list such as RRC (operation 600). The list of TCI states may be indicated by "tci-StatesPDCCH-ToAddList" and/or "tci-StatesPDCCH-ToReleaseList." Next, one from the list of TCI states configured for each CORESET may be activated by the MAC-CE (operation 620). Operation 650 illustrates an example of a MAC-CE structure for TCI state activation. The meaning of each field and a value configured for each field in the MAC-CE are as shown in [Table 18].

TABLE 18

- Serving Cell Identifier (Serving Cell ID): This field indicates the identity of the Serving Cell for which the MAC CE applies. The length of the field is 5 bits;
- CORESET Identifier (CORESET ID): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
- Transmssion control indication Identifier (TCI State ID): This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

a PUSCH transmission slot 505, wherein PUSCH transmission frequency resource area information 530 may be information in units of PRBs or PRB groups.

The PUSCH transmission frequency resource area information 530 is an area included in an initial (uplink) bandwidth (BW) 535 or an initial (uplink) bandwidth part (BWP) 535 that is determined by or is configured for the terminal via an initial access procedure. When a BW or a BWP is configured for the terminal via a higher-layer signal, the PUSCH transmission frequency resource area information 530 may be an area included in the BW or the BWP that is configured via the higher-layer signal.

The PUSCH transmission time resource area information 525 may be information in units of symbols or symbol Next, a scheme of configuring a beam for a PDSCH will be described.

Figure 7:
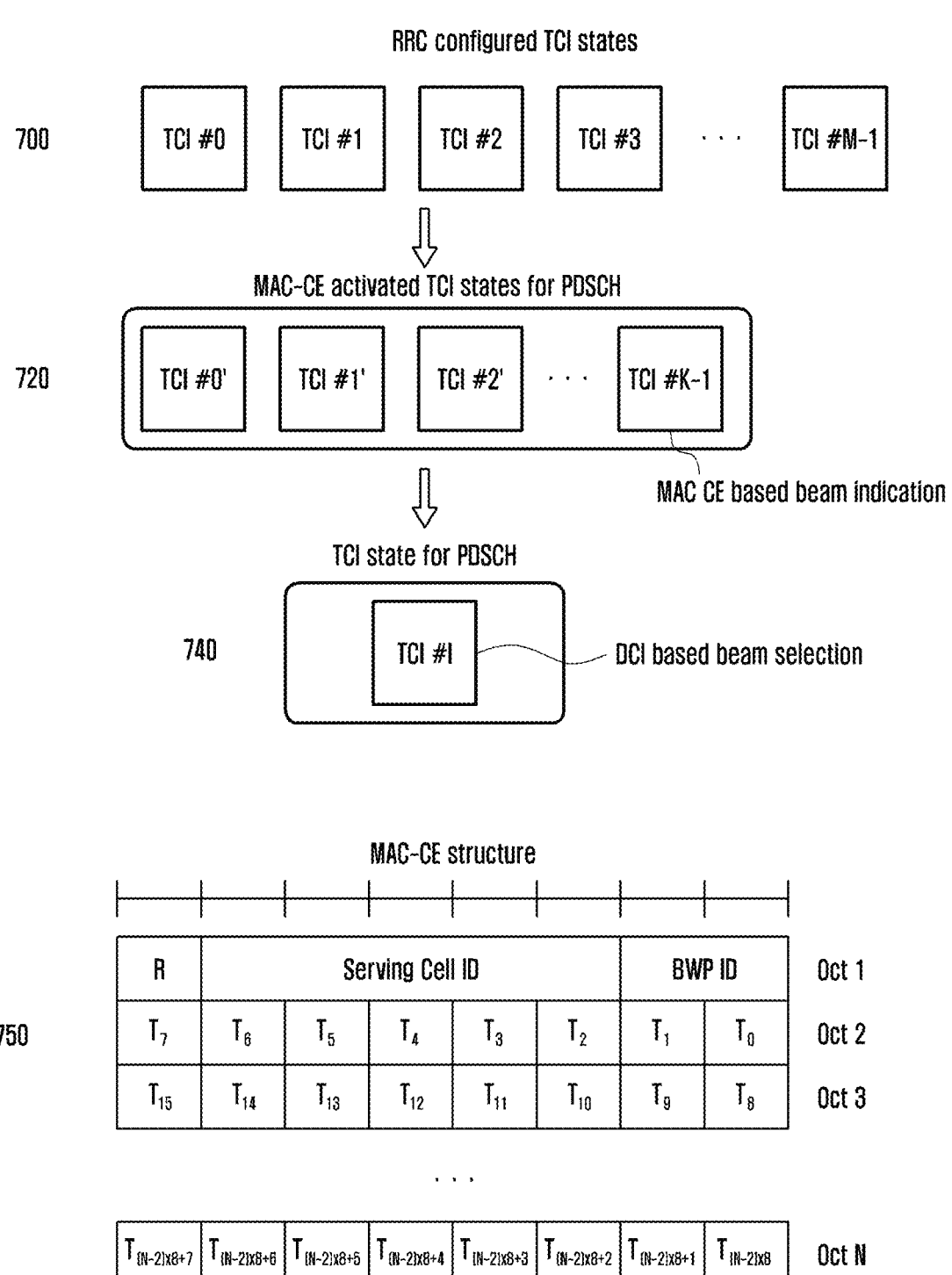
FIG. 7 illustrates a process of beam configuration and activation of a PDSCH according to an embodiment of the disclosure.

FIG. 7 illustrates a process of beam configuration and activation for a PDSCH according to an embodiment of the disclosure.

First, a list of TCI states may be indicated through a higher-layer list such as RRC (operation 700). The list of TCI states may be indicated by, for example, "tci-States-ToAddModList" and/or "tci-StatesToReleaseList" in a PDSCH-Config IE for each BWP. Next, some of the list of TCI states may be activated by the MAC-CE (operation 720). The maximum number of the activated TCI states may be determined according to the capability reported by the terminal. Operation 750 illustrates an example of a MAC-CE structure for TCI state activation/deactivation of a Rel-15-based PDSCH.

The meaning of each field and a value configured for each field in the MAC-CE are as shown in [Table 19].

TABLE 19

- Serving Cell Identifier (Serving Cell ID): This field indicates the identity of the Serving Cell for which the MAC CE applies. The length of the field is 5 bits;
- Bandwidth Part Identifier (BWP ID): This field indicates a DL BWP for which the MAC CE applies as the codepoint of the DCI bandwidth part indicator field as specified in TS 38.212 [9]. The length of the BWP ID field is 2 bits;
- TCI state Identifier i (Ti): If there is a TCI state with TCI-StateId i as specified in TS 38.331 [5], this field indicates the activation/deactivation status of the TCI state with TCI-StateId i, otherwise MAC entity may ignore the Ti field. The Ti field is set to 1 to indicate that the TCI state with TCI-StateId i may be activated and mapped to the codepoint of the DCI Transmission Configuration Indication field, as specified in TS 38.214 [7]. The Ti field is set to 0 to indicate that the TCI state with TCI-StateId i may be deactivated and is not mapped to the codepoint of the DCI Transmission Configuration Indication field. The codepoint to which the TCI State is mapped is determined by its ordinal position among all the TCI States with Ti field set to 1, i.e., the first TCI State with Ti field set to 1 may be mapped to the codepoint value 0, second TCI State with Ti field set to 1 may be mapped to the codepoint value 1 and so on. The maximum number of activated TCI states is 8;
- Reserved Bit (R): Reserved bit, set to 0.

When the terminal has received DCI format 1_1 or DCI format 1_2, the terminal may receive, based on transmission configuration indication (TCI) field information in the DCI, a PDSCH by a beam of TCI states activated by the MAC-CE (operation 740). Whether the TCI field exists may be determined by a tci-PresentinDCI value indicating a higher-layer parameter in a CORESET configured to reception of the DCI. When tci-PresentinDCI is configured to be "enabled" in the higher layer, the terminal may identify a TCI field having 3 bit information and determine the TCI states activated in the DL BWP or the scheduled component carrier and the direction of a beam associated with the DL-RS.

As a part of further enhancement of the existing Rel.16 of the 5th generation (5G) new radio (NR) mobile communication system, in Rel. 17, control and data channel transmissions are being redesigned for better reliability and performance as it can be referred to the 3GPP RAN1 work item document (WID) for Rel-17 further-enhanced multiple 6 GHz bands which are referred to as FR1 and FR2, respectively. Owing to the severe pathloss in higher frequency bands and in order to compensate this loss, operations in FR2 require concentration of the transmitted power in a certain spatial direction by performing beamforming. In this regard, the availability of massive number of antennas, dubbed as massive multiple input multiple output (mMIMO), at the gNBs, allow narrow beams which can direct the transmitted power towards the UE. Similarly, UEs equipped with multiple antennas perform beamforming in their uplink transmission. In the Rel. 15 and 16, beams to be employed for the reception of the downlink and uplink transmissions are indicated to the UE by means of transmission configuration indication (TCI) and spatial relation information, respectively.

As transmission power is directed to a certain spatial direction via beamforming, in NR, uplink power control is also closely related to the applied beamforming. In fact, in Rel. 16 NR, for SRS transmission on active UL bandwidth part (BWP) b of carrier f in the primary cell c using the SRS power control adjustment with index 1, the UE determines the SRS transmission power in SRS transmission occasion i as disclosed in 3GPP TS as below:

$$P_{SRS,b,f,c}(i, q_s, l) = \min \left\{ \begin{array}{l} P_{CMAX,f,c}(i), \\ P_{O\_SRS,b,f,c}(q_s) + 10\log_{10}(2^\mu . M_{SRS,b,f,c}(i)) + \alpha_{SRS,bf,c}(q_s).PL_{b,f,c}(q_d) + h_{b,f,c}(i.l) \end{array} \right. [dBm] \qquad \text{[Equation 3]}$$

input multiple output (FeMIMO). One such enhancement is multiple transmission reception point (mTRP)-based reliability enhancement for physical downlink control channel (PDCCH). The enhancement focuses on improving the reliability of PDCCH by transmitting the same downlink control information (DCI) from multiple TRPs (mTRP) via different multiplexing schemes. Similarly, further enhancement on the reliability of uplink control information (UCI) transmission is being considered by allowing the UE to transmit its UCI to multiple TRPs over repeated (in time domain) physical uplink control channel (PUCCH) transmissions. Furthermore, reliability enhancement for uplink data transmission is also being considered by allowing a UE to transmit the physical uplink shared channel (PUSCH) towards multiple TRPs.

In contrast to the 4G mobile communication system, long-term evolution (LTE), which is deployed over the sub 6 GHz bands, NR considers both the sub 6 GHz and above where $P_{CMAX,f,c}(i)$ is the UE configured maximum output power, $P_{O\_SRS,b,f,c(q_s)}$ power parameter composed of nominal and UE-specific parameters, $$M_{RB,b,f,c}^{PUCCH}(i)$$

is a bandwidth of SRS resource expressed in number of resource blocks (RBs) for SRS resource set $q_s$, and $h_{b,f,c}(i.l)$ is a power control adjustment command. Moreover, $\alpha_{SRS,bf,c}(q_s)$ is pathloss compensation factor and $PL_{b,f,c}(q_d)$ is a power compensation based on downlink pathloss (PL) estimated in dB by the UE from a pathloss reference signal (PL-RS) with resource index $q_d$.

It should be noted that the downlink PL-RS for PL estimation could be a beamformed RS so that accurate PL in a certain direction is measured. It can also be observed that it is optimum if PLRS is chosen in such a way that the spatial setting (beam) employed to measure it is the same with the uplink beam for transmission of SRS, so that accurate compensation of PL be performed. Consequently, in Rel-15 and 16, under normal operations, i.e., when radio resource control (RRC) is configured and uplink spatial relation is provided, the PL-RS is chosen as a periodic reference signal received with the same spatial setting as the intended SRS transmission.

In order to reduce the overhead and latency incurred by the separate indication of uplink and downlink beam information, Rel. 16 introduced default behaviour for the UE with respect to the spatial relation and PLRS to be applied for sounding reference signal (SRS) and PUCCH. This makes more sense as uplink spatial relation information is anyway derived from a downlink beam (reference signal). Moreover, in many cases, the best beam to receive a downlink transmission is also the best beam for uplink transmission. Therefore, it is natural for uplink transmission such as PUCCH, PUSCH and SRS to follow the beam indicated for downlink transmission.

Accordingly, the embodiments herein provide methods and apparatus for selecting the default beam and PL-RS for the transmission of SRS in 5G communication networks. A method disclosed herein describes a UE-side process of acquiring the default beam and PL-RS for transmission of SRS. Similarly, a method disclosed herein describes the gNodeB (gNB)-side process for configuring default beam for transmission of SRS. The present disclosure considers two scenarios for the behaviour of a UE on selecting the default beam and PLRS for the transmission of SRS. The two scenarios included in this disclosure are the scenario wherein the received physical downlink control channel (PDCCH) is in a same-frequency network (SFN) manner and the scenario wherein the received PDCCH is in a non-same frequency network (non-SFN) manner. In particular, methods are disclosed to select a single or multitude of default beams that can be applied at least to the situation where the SRS transmission is intended for mTRP operation.

In the first scenario, i.e., when PDCCH is received in an SFN manner, at least one method is disclosed on selecting a single default beam based on a single transmission configuration information (TCI) state of the received SFNed PDCCH transmission. Moreover, at least one method is also disclosed that combines the TCI states of the received PDCCH, to enable an SRS transmission towards multiple TRPs. Furthermore, multitude of methods are presented to select multiple default beams and PL-RS wherein each beam and PLRS is associated with a single TCI state among the multitude of TCI states associated in the SFNed PDCCH transmission. The method further describes how the multiple default beams and PL-RSs can be applied to multiple SRS resource sets by linking each beam and PL-RS to a corresponding SRS resource set.

Accordingly, in the second scenario, i.e., when PDCCH is received in a non-SFNed manner at least one method is disclosed on selecting a single default beam based on a single transmission configuration information (TCI) state of the received repetition of PDCCH transmissions. The non-SFN scenario considered herein includes both time domain multiplexing (TDM) and frequency domain multiplexing (FDM). Similarly, multitudes of methods are presented to select multiple default beam and PL-RS based on the TCI states of TDMed or FDMed PDCCH transmissions. In this regard, the presented disclosure describes how the multiple default beams and PL-RSs can be applied to multiple SRS resource sets by linking each beam and PL-RS to a corresponding SRS resource set.

In Rel-16 NR, the UE may derive the PL-RS for SRS transmission from pathlossRefrenceRS associated with the SRS resource set. FIG. 8 illustrates an example of a flowchart for obtaining PL-RS that is applied to its SRS transmission. Referring to FIG. 8, the UE identifies whether pathlossReference or SRS-pathlossRefrenceRS-Id is provided (800). When the pathlossRefrenceRS is provided, the pathlossReference may be indicated by either an ssb-Index or csi-RS-Index providing an index of SS/PBCCH (SSB) or CSI-RS resource. Moreover, it is also possible for the UE to be configured with a list of multiple PL-RSs and a semi-persistent activation of one of the PL-RSs by medium access control-control element (MAC-CE) which maps to a certain SRS-pathlossRefrenceRS-Id (810).

If the pathlossReferenceRS (or SRS-pathlossRefrenceRS-Id) is not provided or before the UE receives higher layer parameters, the pathloss is measured and calculated from SSB that the UE used to obtain master information block (MIB) (840). When neither a single pathlossRefrenceRS is configured nor pathlossRefrenceRS-Id is provided, while a default PL-RS is enabled by enableDefaultBeamPL-ForSRS, then the UE derives the default PL-RS as follows (830):

The default PL-RS is a periodic RS resource configured with qcl-type set to "type-D" (simply with the same beam direction) in the TCI state or the QCL assumption of a CORESET with the lowest index, if CORESETs are provided in the active DL band width part (BWP) of a serving cell; and Otherwise, if CORESET is not configured then the default PL-RS for SRS is the active PDSCH TCI state with lowest ID in the active DL BWP.

Figure 9:
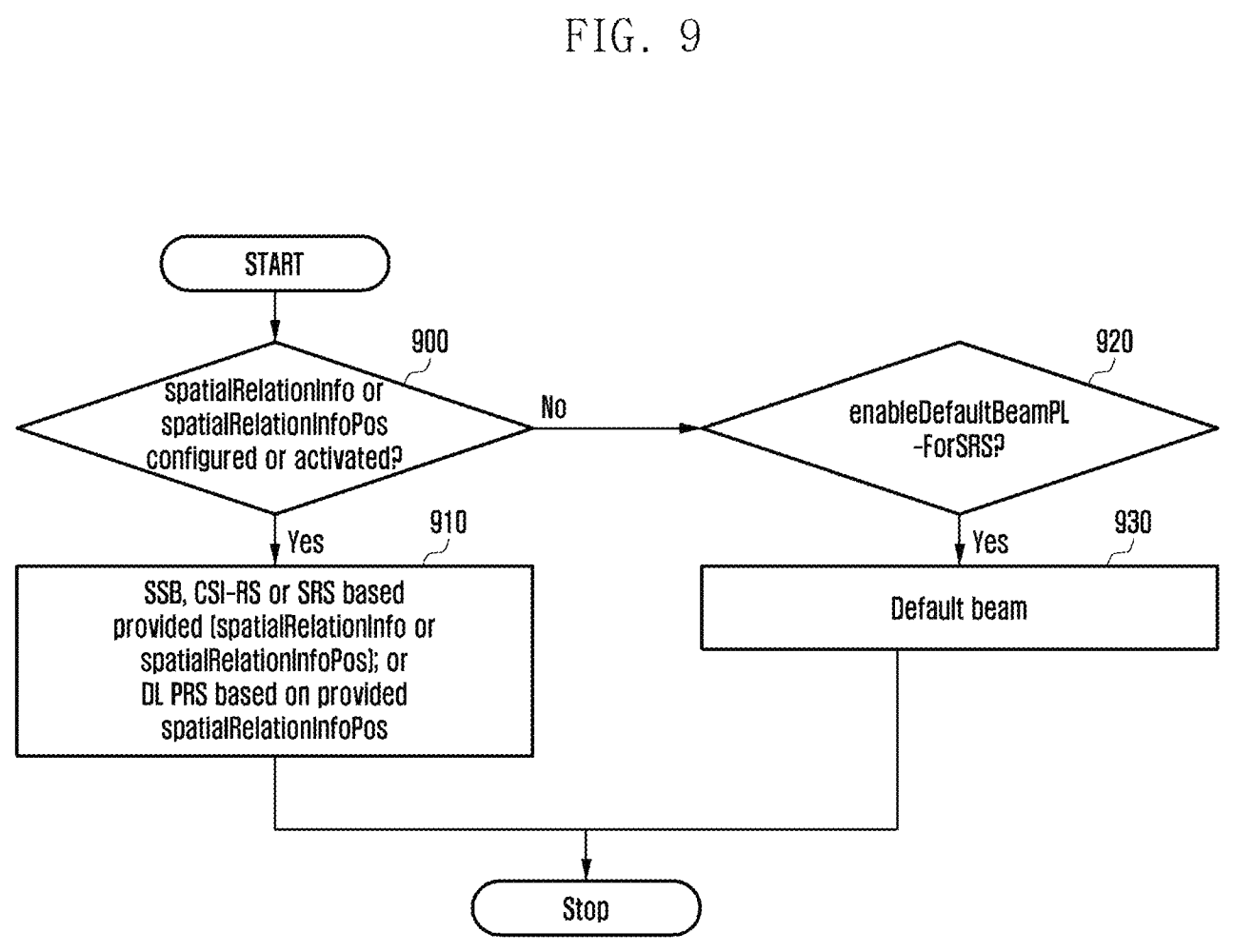

Similarly, in Rel. 16, to obtain the beam (spatial setting) the UE employs to transmit an SRS, the flowchart in FIG. 9 is followed. FIG. 9 illustrates the flowchart for obtaining the beam acquisition for SRS transmission. Referring to FIG. 9, the UE identifies whether higher layer parameter spatialRelationInfo or spatialRelationInfoPos is configured or not (900). If a UE is configured with the higher layer parameter spatialRelationInfo or spatialRelationInfoPos in the SRS resource set, where the latter applies for SRS transmission for UE positioning, then, the UE transmit an SRS with the same spatial setting as an RS with index given by the spatialRelationInfo or spatialRelationInfoPos (910). The RS which is used to derive the transmission beam of SRS could be SSB, CSI-RS or another SRS.

Moreover, for the case of UE positioning, a DL positioning reference signal (DL PRS) could serve as a reference, if the DL PRS is indexed by higher layer parameter spatialRelationInfoPos (910). It is also possible to activate the SRS beam in a semi-persistent manner by MAC-CE signalling where the activated source of spatial reference would override the RRC configured source of spatial relation. If spatialRelationInfo or spatialRelationInfoPos are not configured, the UE identifies that enableDefaultBeamPL-ForSRS is configured (920). If enableDefaultBeamPL-ForSRS is configured then the UE employs default beam for SRS (930).

The default beam for SRS, i.e., the SRS is transmitted with a spatial setting according to the spatial relation, if applicable:

with a reference RS configured with qcl-Type set to "typeD" corresponding to the QCL assumption of the CORESET with the lowest ID if CORESET is configured in the active BWP; and If CORESET is not configure in the active BWP of the CC, then the default beam is derived according to the spatial relation of reference RS configured with qcl-Type set to "typeD" in the active TCI state with the lowest ID applicable to PDSCH.

In order to enhance the reliability of DL and UL transmissions the mTRP-based repetition of PDSCH in Rel. 16 NR and PUCCH, PUSCH and PDCCH in Rel. 17 are considered. The repetition of the same DL/UL data or control information from/to mTRP makes the channels robust against blockage and provide macro-diversity. In this regard, repetition from/towards two TRPs is considered in Rel. 16 and Rel. 17. However, this can be extended to more than 2 TRPs in the future.

Consequently, mTRP PDCCH repetition is agreed to be included in Rel. 17 specification of NR based on both same frequency network (SFN) and non-SFN, i.e., time and frequency division multiplexing (TDM and FDM) schemes. Furthermore, up to 8 TDMed repetitions of PUCCH and PUSCH (with possibility of 16) is agreed to be allowed in Rel. 17 NR. Consequently, based on the beam-to-repetition mapping pattern the two beams, used to transmit towards the two TRPs, can be employed in both sequential and cyclic manner.

Moreover, both codebook (CB) and non-codebook (non-CB)-based mTRP PUSCH repetition is agreed for Rel. 17 NR. It is also agreed to increase the number of SRS resource sets to two, so that precoders towards two TRPs could be separately derived. This implies that by employing two SRS resource sets, the SRS resource indicator (SRI) for both CB and non-CB case, and transmission precoding matrix indicator (TPMI) and rank indicator (RI) for CB case could separately be reported for each TRP.

There are two examples associated with the existing Rel. 16 NR pertaining to default beam of SRS in regard to mTRP operations.

In one example, as a result of the possibility of SFNed PDCCH transmission from mTRP, the existing method (NR Rel. 16) to derive a default spatial setting and PL-RS for SRS cannot directly be applied. This is a direct consequence of the existence of multiple TCI states associated to the SFNed CORESET with lowest ID. Therefore, it is required to resolve this ambiguity on selecting a certain TCI state from a set of TCI states.

In another example, for SRS transmission intended towards mTRPs, it is natural to select multiple default beams so that each beam is mapped to the PUSCH repetitions towards a corresponding TRP. Otherwise, if, for example, a single default PL-RS is selected based on only one TCI state (beam from a certain TRP), then the computed PL may not be accurate to compensate PL for SRS transmission intended towards the remaining TRPs. Similarly, if a spatial setting is selected based on a single TCI state, then the accurate derivation of SRI, TPMI and RI derivation for PUSCH transmissions towards the remaining TRPs may not be accurate. Therefore, it is essential to consider multiple default beams for SRS transmission towards mTRP. The prior art does not provide a means of deriving multiple default beams for SRSs transmissions towards multiple TRPs.

This disclosure considers the behaviour of UE towards selecting default PL-RS(s) and default spatial-relation setting(s) (beam) in scenarios wherein:

(1) the PDCCH transmission is SFNed and multiple TCI states are associated to a CORESET with lowest ID, and (2) multiple SRS resource sets are transmitted towards mTRP.

The below sections discuss two scenarios for default beam behaviour considerations for SRS, i.e., SRS transmission setting and PL-RS for SRS. For each scenario, two PDCCH schemes, namely SFN scheme and non-SFN scheme, are considered. And for each scheme in each scenario, multiple solutions are discussed for the default beam assumption of SRS, of which one or more solutions are applicable to a given scenario. Without loss of generality, the discussion below for the presented solutions is based on the currently agreed mTRP operation, i.e., two SRS resource sets towards two TRPs. In the last section, however, it is discussed that the presented solution can be extended to any arbitrary number of TRPs.

Figure 10:
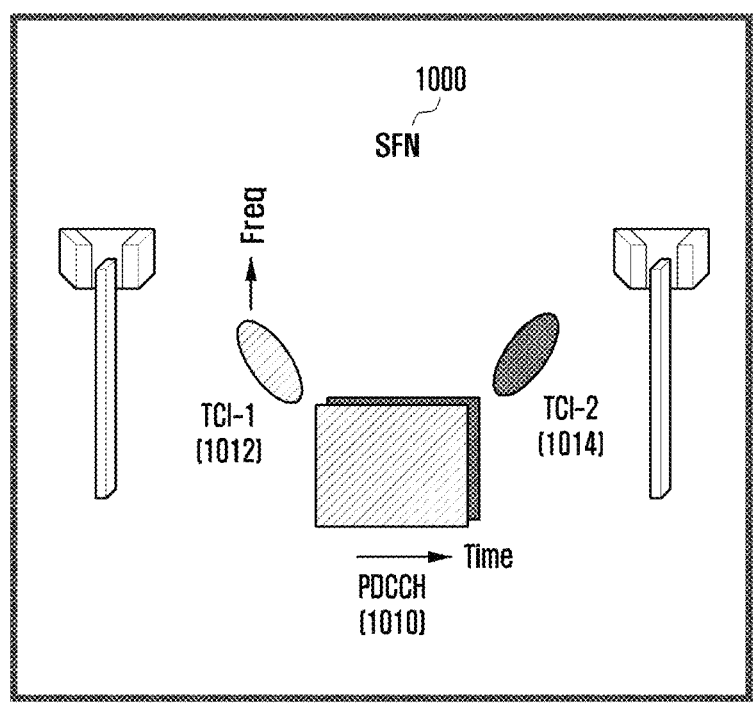
FIG. 10 is an illustrative an example of SFN-based PDCCH Transmission where two PDCCH are received in the same time-frequency resources from two TRPs according to an embodiment of disclosure.

FIG. 10 illustrates an example of the SFNed PDCCH transmission scheme. For SFNed PDCCH scheme, CORESET used for PDCCH transmission is configured with more than one TCI states corresponding to different quasi co-location (QCL) parameters, where each PDCCH candidate of a monitored search space maps to at least one TCI state. Same downlink control information (DCI) is transmitted over the same time-frequency resource from each TRP. Upon reception of the PDCCH occasion, the UE performs channel estimation over the PDCCH demodulation reference signal (DM-RS) port considering a combined QCL parameter with respect to the configured TCI states. Referring to FIG. 10, in 1000, same DCI is transmitted on the PDCCH (1010). PDCCH (1010) maps to the TCI state TCI-1(1012) and the TCI state TCI-2(1014).

Figure 11:
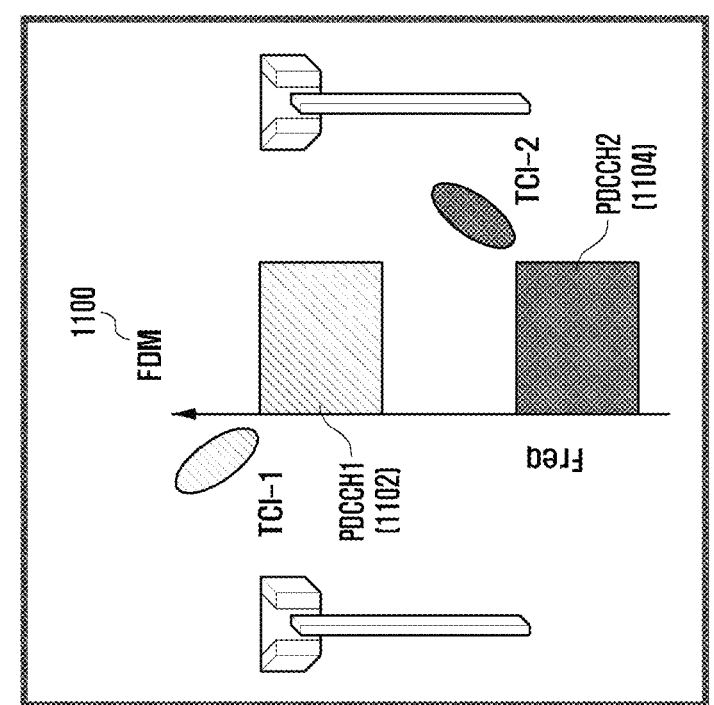
FIG. 11 is an illustrative an example of non-SFN-based PDCCH Transmission where two PDCCH are received in the TDM and FDM manner from two TRPs according to an embodiment of disclosure.

FIG. 11 illustrates examples of non-SFNed PDCCH transmission scheme. For non-SFN scheme, the PDCCH transmission is monitored over more than one search space each associated with the respective control resource set (CORESET) with different transmission configuration indication (TCI) state corresponding to different quasi co-location (QCL) parameters. The same DCI is transmitted over multiple transmission occasions from each TRP in different time resources as time division multiplexing (TDM) or in different frequency resources as frequency division multiplexing (FDM). Upon reception of the PDCCH occasions from different search spaces, the UE performs channel estimation over the PDCCH demodulation reference signal (DMRS) port considering different QCL parameters over each occasion, with respect to the configured TCI states.

Referring to FIG. 11, examples of the FDM scheme (1100) and the TDM scheme (1150) are illustrated. In the FDM scheme (1100), same DCI is transmitted on the PDCCH 1(1102) and the PDCCH 2(1104) which are allocated in the different frequency resources. PDCCH 1(1102) maps to the TCI state TCI-1 and PDCCH 2(1104) maps to the TCI state TCI-2. In the TDM scheme (1150), same DCI is transmitted on the PDCCH 1(1152) and the PDCCH 2(1154) which are allocated in the different time resources. PDCCH 1(1152) maps to the TCI state TCI-1 and PDCCH 2(1154) maps to the TCI state TCI-2.

In the following, the general default beam acquisition process for the present disclosure is presented. In this regard, the detailed processes from the UE side and the base station (gNB) side are illustrated. Moreover, the presented flowcharts are agnostic with the cases where the UE receives PDCCH in SFN and non-SFN manner, i.e., the flowcharts in this subsection apply for both cases.

Figure 12:
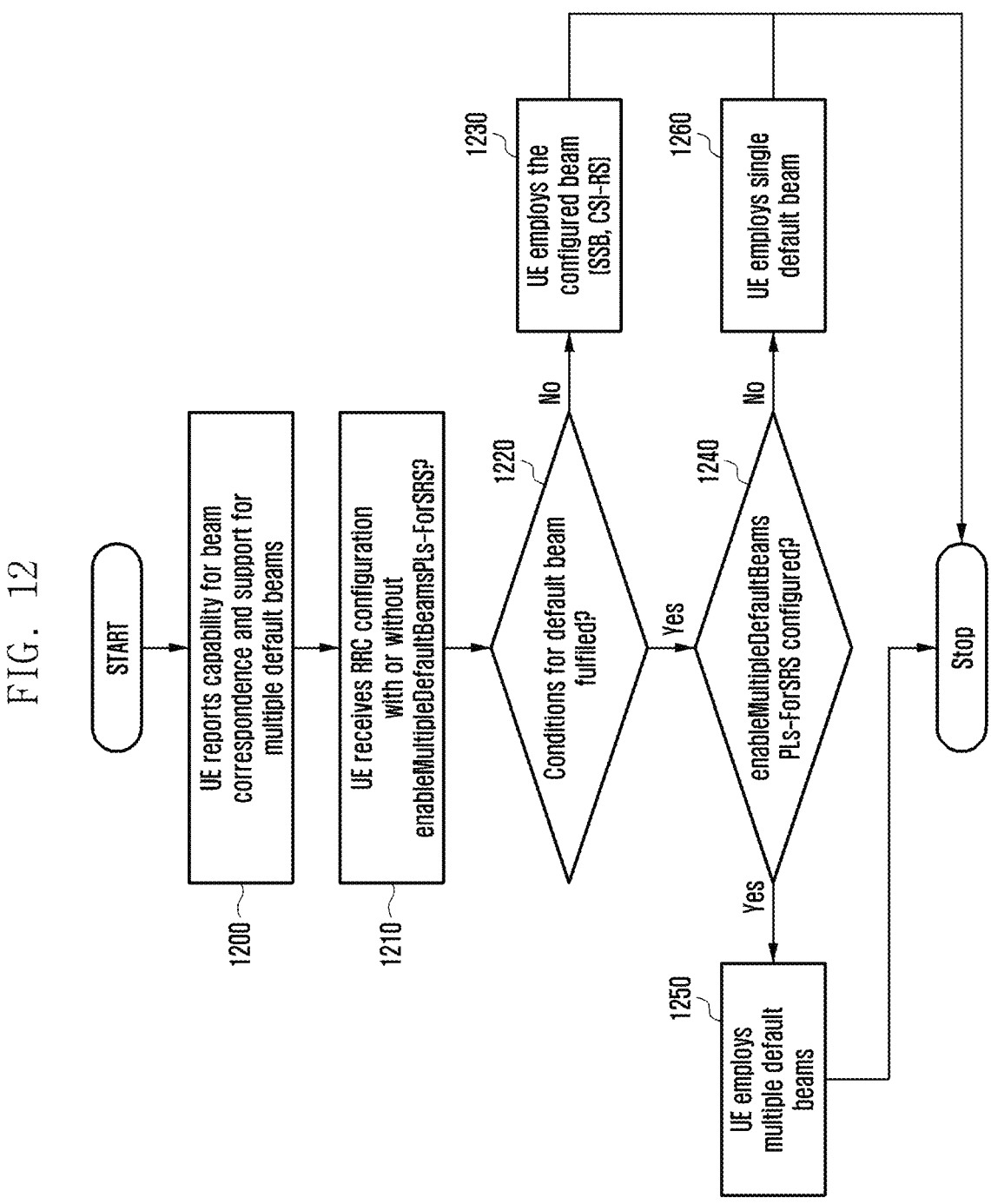
FIG. 12 illustrates a flowchart for an example of the UE-side process of acquiring a default beam and PLRS for the transmission of SRS according to an embodiment of disclosure.

FIG. 12 illustrates an example of the process of the UE to acquire default beam for SRS transmission and the corresponding PL computation. Referring to FIG. 12, similar to the Rel. 16 scheme, a UE first reports capability on whether the UE supports beam correspondence and multiple default beams (1200). Upon reception of UE's capability report, the gNB then configures and hence the UE receives RRC configuration with or without enableMultipleDefaultBeamsPLs-ForSRS (1210). "enableMultipleDefaultBeamsPLs-ForSRS" is a new RRC parameter that is provided to enable multiple default beams for transmission of SRS and the corresponding PL measurement.

The UE then identifies whether the conditions for default beam are fulfilled based on the flowcharts and conditions thereof in FIG. 8 and FIG. 9 (1220). If the conditions are not fulfilled, that means an explicit beam is either configured via RRC or activated via MAC-CE. In this case, the UE employs the explicitly configured beam based on the indicated RS index (SSB, CSI-RS or SRS) (1230). If the conditions for default beam are fulfilled, the UE then identifies whether multiple default beams are enabled or not depending on whether enableMultipleDefaultBeamsPLs-ForSRS is configured or not (1240). Finally, based on the configuration of enableMultipleDefaultBeamsPLs-ForSRS the UE applies either single default beam (1260) or multiple default beams (1250).

The higher layer parameter enableMultipleDefaultBeamsPLs-ForSRS can be provided in RRC configuration under UplinkConfig. Moreover, enableMultipleDefaultBeamsPLs-ForSRS may be provided along with the higher parameter enableDefaultBeamPL-ForSRS so that multiple default beams can be considered by the UE. The details of how to choose the default beams are presented in the following subsections. The signalling structure in RRC to enable multiple default beams can be given as shown in [Table 20].

TABLE 20

```
UplinkConfig ::=                        SEQUENCE {
    initialUplinkBWP                        BWP-UplinkDedicated OPTIONAL,
    enableDefaultBeamPL-ForPUSCH0-0-r16 ENUMERATED {enabled} OPTIONAL,
    enableDefaultBeamPL-ForPUCCH-r16    ENUMERATED {enabled} OPTIONAL,
    enableDefaultBeamPL-ForSRS-r16       ENUMERATED {enabled} OPTIONAL,
    enableMultipleDefaultBeamsPLs-ForSRS   ENUMERATED {enabled} OPTIONAL,
]]
}
```

The provided higher layer parameter can indicate the enablement of at least one of multiple default beams for transmission of the SRS or multiple PL-RSs for PL measurement. Instead of a single parameter, two higher layer parameters may indicate the enablement of multiple default beams for transmission of the SRS and the enablement of multiple PL-RSs for PL measurement, respectively. It is also possible to provide only one of the two higher layer parameters.

Figure 13:
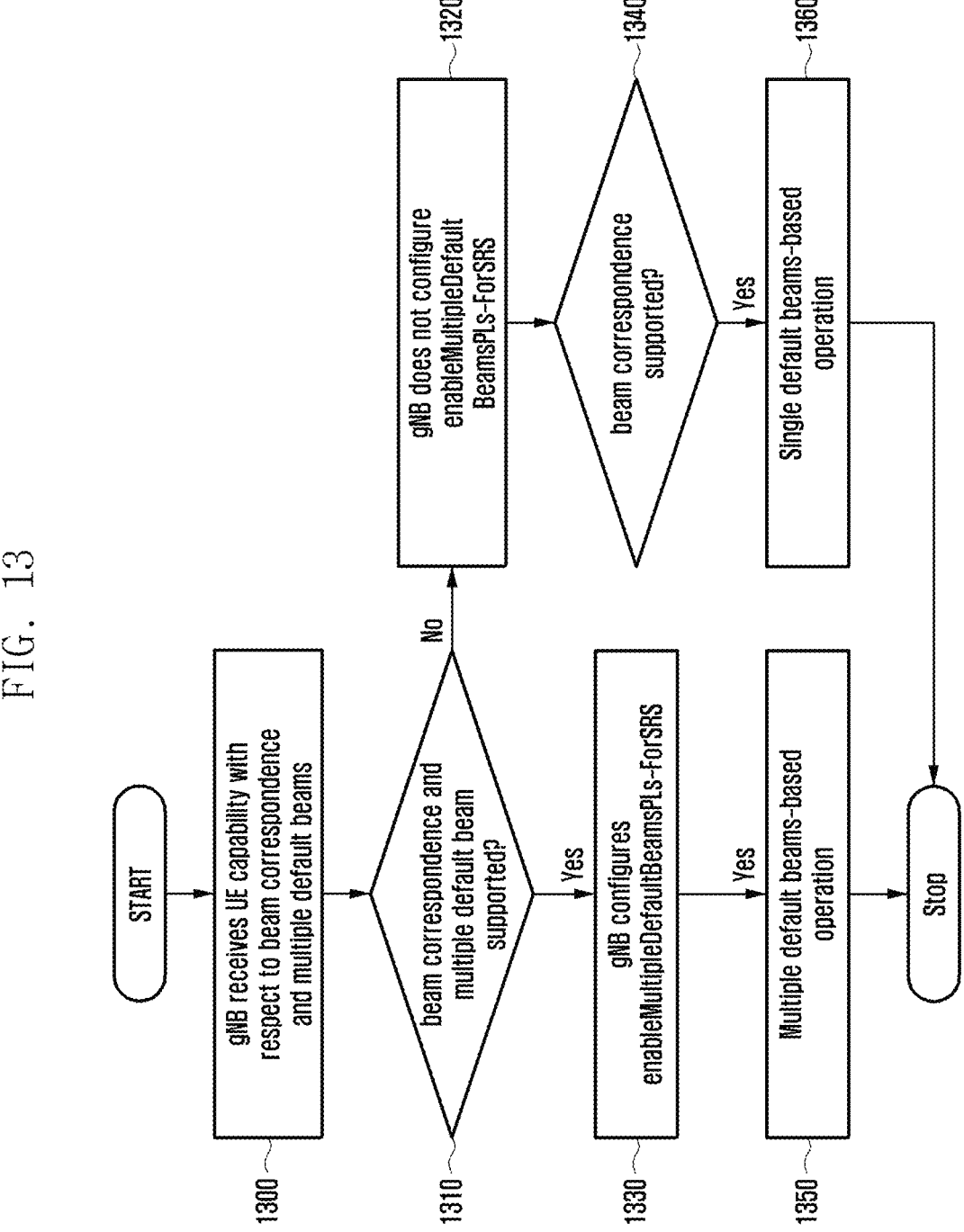
FIG. 13 illustrates a flowchart for an example of the gNB-side process of acquiring a default beam and PLRS for the transmission of SRS according to an embodiment of disclosure.

FIG. 13 illustrates an example of the process of the gNB pertaining to SRS default beams from the gNB's perspective. Referring to FIG. 13, upon reception of UE's capability report with respect to beam correspondence and support for multiple default beams (1300), the gNB decides whether to configure enableMultipleDefaultBeamsPLs-ForSRS or not based on the UE's capability (1310). If the UE supports beam correspondence and multiple default beams, then the gNB configures the UE with enableMultipleDefaultBeamsPLs-ForSRS via RRC configuration (1330). Otherwise, the gNB do not configure enableMultipleDefaultBeamsPLs-ForSRS (1320).

Moreover, if only beam correspondence is supported (1340), then a single default beam-based operations are conducted (1360). On the other hand, if both beam correspondence and multiple default beams are supported, then the gNB configures enableMultipleDefaultBeamsPLs- ForSRS and undertake multiple default-beams based operations according to the conditions detailed in the subsequent sections (1350). Moreover, if both beam correspondence and multiple default-beams are not supported, then the gNB does not configure the UE with both enableMultipleDefaultBeamsPLs-ForSRS and enableDefaultBeamPL-ForSRS.

In the following a single beam-based solutions are presented for default PL-RS. Single beam based solutions are the simplest form of solutions where they can be considered as an extension to the existing solution in Rel. 16 NR. Therefore, the main aim of single beam-based solutions is to solve the first issue, i.e., the ambiguity between selecting from multiple TCI states for SRS default beam (PL-RS and spatial setting).

Therefore, the following 4 condition in Rel. 16 are also considered and one more condition is added based on the availability of multiple TCI states activated by MAC-CE.

The conditions for applying embodiment I.1-4 are given as follows:

Condition I.1.1: the UE is not provided pathlossReferenceRS or SRS-PathlossReferenceRS-Id, Condition I.1.2: the UE is not provided spatialRelationInfo, and Condition I.1.3: the UE is provided enableDefaultBeamPL-ForSRS, and not provided enableMultipleDefaultBeamsPLs-ForSRS, and Condition I.1.4: the UE is not provided coresetPoolIndex value of 1 for any CORESET, or is provided coresetPoolIndex value of 1 for all CORESETs, in Control-ResourceSet and no codepoint of a TCI field, if any, in a DCI format of any search space set maps to two TCI states as defined in 3GPP standard specification TS 38.212.

For SFNed PDCCH Scheme, following condition 1.1.5 may be additionally satisfied:

Condition I.1.5: the UE is provided with at least one CORESET with multiple TCI states activated using MAC-CE command.

When those conditions are satisfied, the UE determines the PL-RS with a RS resource index qd by following methods.

In case of spatial relation with respect to single TCI, method I.1 and I.2 are provided:

method I.1.1: the UE determines the RS resource index qd providing a periodic RS resource with "QCL-TypeD" in the TCI state or the QCL assumption of the lowest TCI state ID activated for a CORESET with the lowest index;

method I.1.2: the UE determines the RS resource index qd providing a periodic RS resource with "QCL-TypeD" in the TCI state or the QCL assumption of the highest TCI state ID activated for a CORESET with the lowest index;

method I.1.3: the UE determines the RS resource index qd providing a periodic RS resource with "QCL-TypeD"

in the TCI state or the QCL assumption of the first TCI state ID, with respect to ordinal position in MAC-CE, activated by the MAC CE activation command for a CORESET with the lowest index;

method I.1.4: the UE determines the RS resource index qd providing a periodic RS resource with "QCL-TypeD" in the TCI state or the QCL assumption of the last TCI state ID activated by the MAC CE activation command for a CORESET with the lowest index; and method I.2: the UE determines the RS resource index qd providing a periodic RS resource with "QCL-TypeD" in the TCI state or the QCL assumption of a CORESET with the lowest index, configured with a single TCI state.

One or more of the above-described methods may be combined and implemented.

In case of spatial relation with respect to multiple TCI, method I.3 is provided:

method I.3: the UE determines the RS resource index qd providing a periodic RS resource with "QCL-TypeD" in the QCL assumption of a CORESET with the lowest index, where the spatial setting for the CORESET is a combination of the QCL assumptions of all the TCI states activated for the CORESET.

For Non-SFNed PDCCH Scheme, when Single CORE-SETPoolIndex is provided and Condition I.1.1 to Condition I.1.4 are fulfilled the UE determines a RS resource index $q_d$ providing a periodic RS resource with "QCL-TypeD" in the TCI state or the QCL assumption of a CORESET with the lowest index (method I.4).

In the following multiple default beams-based solutions are presented for default PL-RS of SRS. Multiple default beams-based solution allow PL computation based on multiple PL-RSs for accurate PL compensation associated with SRS transmission towards mTRP. Therefore, multiple default beam-based solutions solve both the first issue and second issue above.

Here, the first 3 conditions in Rel. 16 are also considered while dropping the 4th condition which precludes multiple beams for SRS resource sets towards mTRP:

Condition I.2.1: the UE is not provided pathlossReferenceRSs, or SRS-PathlossReferenceRS-Id, Condition I.2.2: the UE is not provided spatialRelation-Info, and Condition I.2.3: the UE is provided enableDefault-BeamPL-ForSRS and enableMultipleDefaultBeam-sPLs-ForSRS.

For SFNed PDCCH Scheme, following condition 1.2.4 may be satisfied:

Condition I.2.4: the UE is provided with at least one CORESET with multiple TCI states activated using MAC-CE command.

When those conditions are satisfied, the UE determines the PL-RS with a RS resource index $q_d$ by following methods.

In case of spatial relation with respect to single TCI per each SRS beam, method I.5 is provided:

method I.5: the UE determines the RS resource index qd providing a periodic RS resource with "QCL-TypeD" in the corresponding QCL assumption of a CORESET with the lowest index, where the QCL assumption is set by linking the two TCI states, activated for the CORE-SET using MAC CE command, to two beams for SRS resource sets;

method I.5.1: Lowest and highest TCI state IDs are activated for the first and second beam (based on SRS beam-to-TRP mapping pattern), respectively, and method I.5.2: First and last TCI states based on their ordinal position in the MAC-CE activation are activated for the first and second beam (based on SRS beam-to-TRP mapping pattern), respectively.

One or more of the above-described methods may be combined and implemented.

For Non-SFNed PDCCH Scheme, the case that single coresetPoolIndex is provided is described below.

When Condition I.2.1 to Condition I.2.3 are fulfilled, the UE determines the PL-RS with a RS resource index $q_d$ by following method I.6:

method I.6: the UE determines the RS resource index qd providing a periodic RS resource with "QCL-TypeD" in the corresponding QCL assumption of a CORESET with the lowest index, where the QCL assumption is set by linking the TCI states, activated for the CORESET using MAC CE command, to SRS beams:

method I.6.1: TCI states in the first and last CORESETs carrying the repeated PDCCH are activated for the first and second beam (based on SRS beam-to-TRP mapping pattern), respectively (for TDM scheme), and.

method I.6.2: TCI states in the lowest and highest frequency location of search spaces (SSs) for CORE-SETs carrying the repeated PDCCH are activated for the first and second beam (based on SRS beam-to-TRP mapping pattern), respectively (for FDM scheme).

One or more of the above-described methods may be combined and implemented.

For Non-SFNed PDCCH Scheme, the case that multiple coresetPoolIndex are provided is described below.

When Condition I.2.1 to Condition I.1.3 are fulfilled, the UE determines the PL-RS with a RS resource index $q_d$ by following method I.7:

method I.7: the UE determines the RS resource index qd providing a periodic RS resource with "QCL-TypeD" in the corresponding QCL assumption in the TCI state of a CORESET with an index identified following methods:

method I.7.1: the UE determines the RS resource index qd providing a periodic RS resource with "QCL-TypeD" in the corresponding QCL assumption in the TCI state of a CORESET with the lowest index among CORESETs configured with the same coresetPoolIndex, and method I.7.2: the UE determines the RS resource index qd providing a periodic RS resource with "QCL-TypeD" in the corresponding QCL assumption in the TCI state of a CORESET with the highest index among CORESETs configured with the same coresetPoolIndex.

One or more of the above-described methods may be combined and implemented.

where the QCL assumptions are set by linking TCI states corresponding to coresetPoolIndex 0 and 1 to the first and second beam (based on beam repetition pattern), respectively.

In the following, a single beam-based solution is presented for default spatial settings of SRS transmission. Similar to the previous section, a single beam-based solution is first presented which are the simplest form of solutions where it can be considered as an extension to the existing solution in Rel. 16 NR. Therefore, the main aim of single beam-based solutions is to solve the first issue, i.e., the ambiguity between selecting from multiple TCI states for SRS default beam (spatial setting).

Therefore, the following 4 condition in Rel. 16 are also considered:

Condition II.1.1: the higher layer parameter spatialRelationInfo for the SRS resource, except for the SRS resource with the higher layer parameter usage in SRS-ResourceSet set to "beamManagement" or for the SRS resource with the higher layer parameter usage in SRS-ResourceSet set to "nonCodebook" with configuration of associatedCSI-RS or for the SRS resource configured by the higher layer parameter SRS-PosResourceSet, is not configured in FR2;

Condition II.1.2: the UE is not configured with higher layer parameter(s) pathlossReferenceRS;

Condition II.1.3: enableDefaultBeamPL-ForSRS are provided, enableMultipleDefaultBeamsPLs-ForSRS not provided; and Condition II.1.4: the UE is not configured with different values of coresetPoolIndex in ControlResourceSets, and is not provided at least one TCI codepoint mapped with two TCI states, the UE may transmit the target SRS resource in an active UL BWP of a CC.

For SFNed PDCCH Scheme, following condition II.1.5 may be additionally satisfied:

Condition II.1.5: the UE is provided with at least one CORESET with multiple TCI states activated using MAC-CE command.

When Condition II.2.1 to Condition II.2.5 is satisfied, the UE may transmit the target SRS resource in an active UL BWP of a CC, with QCL assumptions according to following methods.

In case of spatial relation with respect to single TCI, method II.1 and II.2 are provided:

method II.1.1: the UE may transmit the target SRS resource in an active UL BWP of a CC, with QCL assumptions of the lowest TCI state ID used for PDCCH quasi co-location indication of the CORESET with the lowest controlResourceSetId;

method II.1.2: the UE may transmit the target SRS resource in an active UL BWP of a CC, with QCL assumptions of the highest TCI state ID used for PDCCH quasi co-location indication of the CORESET with the lowest controlResourceSetId;

method II.1.3: the UE may transmit the target SRS resource in an active UL BWP of a CC, with QCL assumptions of the first TCI state ID used for PDCCH quasi co-location indication of the CORESET with the lowest controlResourceSetId;

method II.1.4: the UE may transmit the target SRS resource in an active UL BWP of a CC, with QCL assumptions of the last TCI state ID used for PDCCH quasi co-location indication of the CORESET with the lowest controlResourceSetId; and method II.2: the UE may transmit the target SRS resource in an active UL BWP of a CC, with QCL assumptions of the CORESET with the lowest controlResourceSetId activated with a single TCI state.

In case of spatial relation with respect to multiple TCI, the UE may transmit the target SRS resource in an active UL BWP of a CC, with QCL assumptions of the CORESET with the lowest controlResourceSetId, where the spatial setting for the CORESET is a combination of the QCL assumptions of all the TCI states activated for the CORESET (method II.3).

One or more of the above-described methods may be combined and implemented.

For non-SFNed PDCCH Scheme, the case that Single CORESETPoolIndex is provided is described below.

When Condition II.1.1 to Condition II.1.4 are satisfied, the UE may transmit the target SRS resource in an active UL BWP of a CC, according to the spatial relation, if applicable, with a reference to the RS with "QCL-TypeD" corresponding to the QCL assumption of the CORESET with the lowest controlResourceSetId (Method II.4)

In the following multiple default beams-based solutions are presented for default spatial settings. Multiple default beams-based solutions allow beamformed SRS resource sets transmissions towards multiple TRPs. Therefore, multiple default beams-based solutions solve both the first issue and second issue.

Here, the first 3 conditions in Rel. 16 are also considered while dropping the 4th condition which precludes the transmission of two SRS resource sets with multiple beams:

Condition II.2.1: the higher layer parameter spatialRelationInfo for the SRS resource, except for the SRS resource with the higher layer parameter usage in SRS-ResourceSet set to "beamManagement" or for the SRS resource with the higher layer parameter usage in SRS-ResourceSet set to "nonCodebook" with configuration of associatedCSI-RS or for the SRS resource configured by the higher layer parameter SRS-PosResourceSet, is not configured in FR2;

Condition II.2.2: the UE is not configured with higher layer parameter(s) pathlossReferenceRS; and Condition II.2.3: enableDefaultBeamPL-ForSRS and enableMultipleDefaultBeamsPLs-ForSRS is provided.

A spatial setting for an SRS transmission from the UE may be same as a spatial setting identified based on following methods.

For SFNed PDCCH Scheme, following condition II.2.4 may be additionally satisfied:

Condition II.2.4: if the UE is not configured with different values of coresetPoolIndex in ControlResourceSets, and is not provided at least one TCI codepoint mapped with two TCI states.

In case of spatial relation with respect to single TCI per each SRS beam, the UE may transmit the target SRS resource in an active UL BWP of a CC by following method II.5:

method II 5: the UE may transmit the target SRS resource in an active UL BWP of a CC with the corresponding QCL assumption of a CORESET with the lowest index, where the QCL assumption is set by linking the TCI states, activated for the CORESET using MAC CE command, to the beams SRS resource sets are transmitted with:

method II 5.1: Lowest and highest TCI state IDs are activated for the first and second beam (based on beam-repetition association pattern), respectively, and method II 5.2: First and last TCI states based on their ordinal position in the MAC-CE activation are activated for the first and second beam (based on SRS beam-to-TRP mapping pattern), respectively.

One or more of the above-described methods may be combined and implemented.

For non-SFNed PDCCH Scheme, the case that Single coresetPoolIndex is provided is described below.

When Condition II.2.1 to Condition II.2.3 are fulfilled the the UE may transmit the target SRS resource in an active UL BWP of a CC by following method II.6:

method II 6: the UE may transmit the target SRS resource in an active UL BWP of a CC with the corresponding QCL assumption of a CORESET with the lowest index, where the QCL assumption is set by linking the TCI states, activated for the CORESET using MAC CE command, to SRS beams:

method II 6.1: the first and Last TCI state IDs are activated for the first and second beam (based on SRS beam-to-TRP mapping pattern), respectively, and method II 6.2: the TCI state IDs in the lowest and highest frequency location of (search spaces) SSs are activated for the first and second beam (based on SRS beam-to-TRP mapping pattern), respectively.

One or more of the above-described methods may be combined and implemented.

If Multiple coresetPoolIndex are provided, when Condition II.2.1 to Condition II.2.4 are fulfilled the UE may transmit the target SRS resource in an active UL BWP of a CC by following method II.7:

method II 7.1: the UE may transmit the target SRS resource in an active UL BWP of a CC with the corresponding QCL assumption of a CORESET with the lowest index among CORESETs configured with the same coresetPoolIndex; and method II 7.2: the UE may transmit the target SRS resource in an active UL BWP of a CC with the corresponding QCL assumption of a CORESET with the highest index among CORESETs configured with the same coresetPoolIndex.

One or more of the above-described methods may be combined and implemented.

where the QCL assumptions are set by linking TCI states corresponding to coresetPoolIndex 0 and 1 to the first and second beam (based on beam repetition pattern), respectively.

Examples of possible implementations of this disclosure are described. For method I.3, when PL is computed from a PL-RS obtained by combining the beam information (multiple TCI states) of PDCCH transmissions, the following could be considered. Without loss of generality let us consider two TRPs (beams) case while noting that the ideas below can be extended to any arbitrary number of TRPs.

Figure 14:
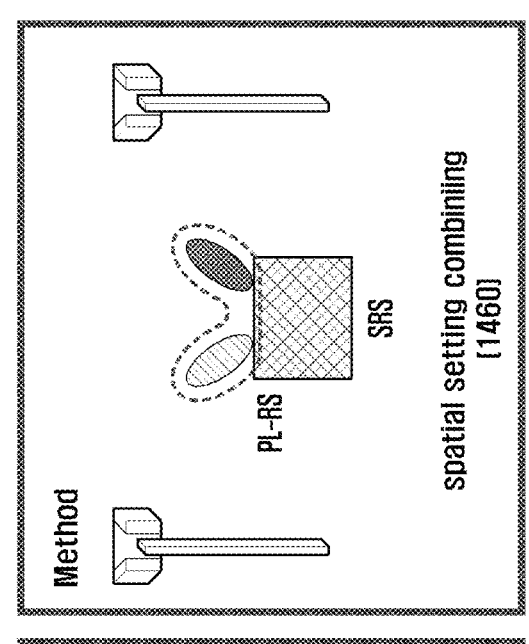
FIG. 14 illustrates an example of a possible realization of method I 3 wherein an example is given based on SFNed transmission from two TRPs according to an embodiment of disclosure.
Figure 14:
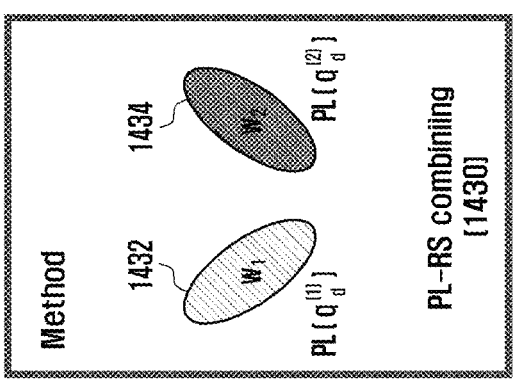
Figure 14:
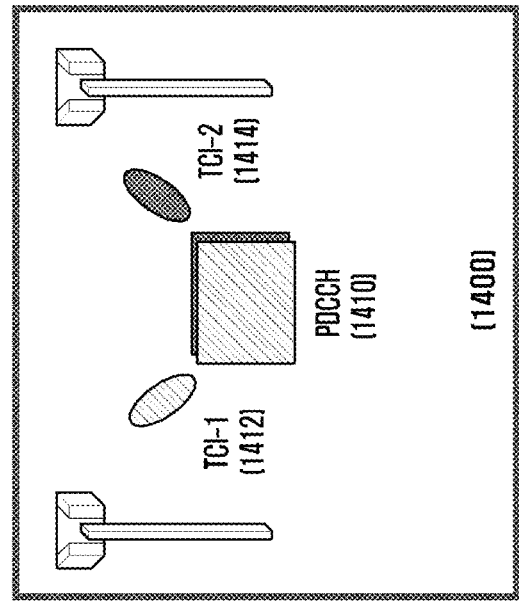

FIG. 14 illustrates an example of method I.3. In 1400, The PDCCH (1410), received with two beams (1412 and 1414), is an SFNed PDCCH reception associated to two TCI states, i.e., TCI-1 and TCI-2. As shown in 1430, even if the PDCCH is transmitted by two beams, the PL can be computed by combining the PL measurement from PL-RSs while considering the two beams as one. Therefore, in method I.3 the PL computed by combining the two TCI states of the received PDCCH can be given as equation 4:

$$PL_{b,f,c}(q_d) = w_1 PL_{b,f,c}(q_d^{(1)}) + w_2 PL_{b,f,c}(q_d^{(2)}) \qquad \text{[Equation 4]}$$

where $q_d^{(1)}$ and $q_d^{(2)}$ are indices of periodic RS resources configured with TCI-1 and TCI-2 of the corresponding CORESET with lowest ID where the SFNed PDCCH are received. Moreover, $w_1$ and $w_2$ are a weighting factors to compute the weighted average of PLs corresponding to each beam.

Similarly, for method II.3 (1460), the transmission spatial setting for the corresponding SRS transmission can be selected by combining the two beams, with which the PDCCH is received, into one single beam (1462). After a UE estimates the PL from a PL-RS which is received by combining the QCL assumptions used to receive SFNed PDCCH transmission and the PL is computed with a corresponding weight (1432) and (1434), then the same weights can be employed to assign relative power to beam lobes of a beam formed for SRS transmission in method II 3 (1460).

For method I.7 and method II.7, the case for multiple coresetPoolIndex is considered. In this case, the mTRP PDCCH transmission could be associated to multiple (two in Rel. 16 and 17 NR) CORESET pools. Then the corresponding multiple beams for PL-RS and transmission of SRS, could be derived from CORESETs associated with different coresetPoolIndex depending on the rules given in method I.7.1 to I.7.2 and method II.7.1-II.7.2, respectively.

Figure 15:
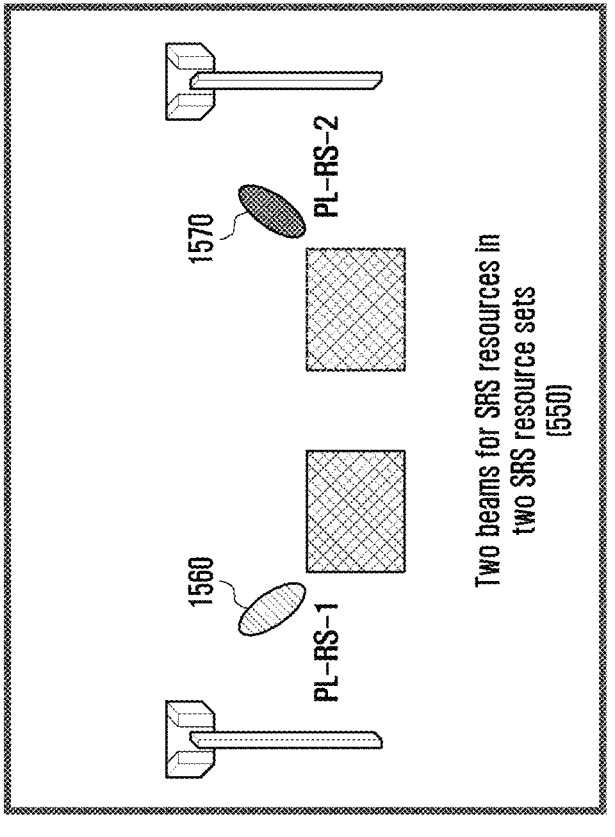
FIG. 15 illustrates an example of a possible realization of method II 7.1 in which an example is given based on PDCCH transmission from two TRPs according to an embodiment of disclosure.
Figure 15:
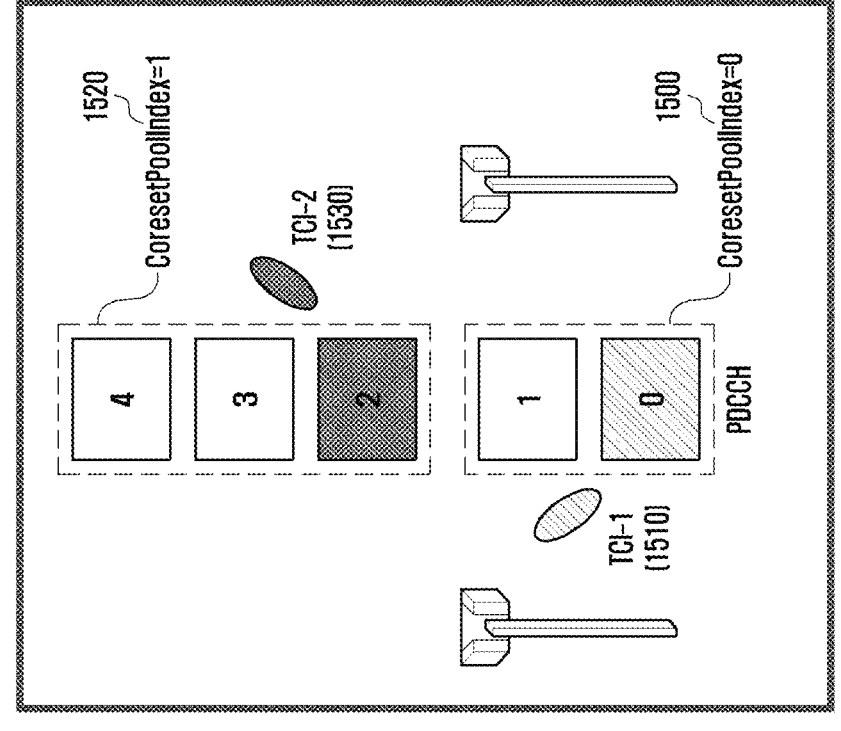

FIG. 15 illustrates an example for method II.7.1. In this example, in method II.7.1(1550), two SRS resource sets are transmitted based on two default beams (1560) and (1570) derived from the spatial settings with the same QCL assumption as the CORESETs with lowest ID in their respective pools, i.e., coresetPoolIndex=0 (1500) and coresetPoolIndex=1 (1520). The spatial settings for two SRS resource sets correspond to TCI state TCI-1(1510) for coresetPoolIndex=0 and TCI state TCI-2(1530) for coresetPoolIndex=1.

Generalization to an arbitrary number of TRPs and SRS default beams is provided. In the above, the present disclosure provides a special case wherein PDCCH is received from two TRPs in both SFNed and non-SFNed manner. Moreover, up to two default beams are considered for SRS transmission. This spatial case setting is aligned with the existing Rel. 16 NR and agreements for NR Rel. 17. However, this setting can be generalized to an arbitrary number of TRPs and SRS beams. Let the PDCCH is repeated from M TRPs in either SFN or non-SFN manner. Furthermore, let the L SRS transmission are transmitted with N beams. The mapping between the N beams and L TRPs can be sequential or cyclic as discussed above.

Figure 16:
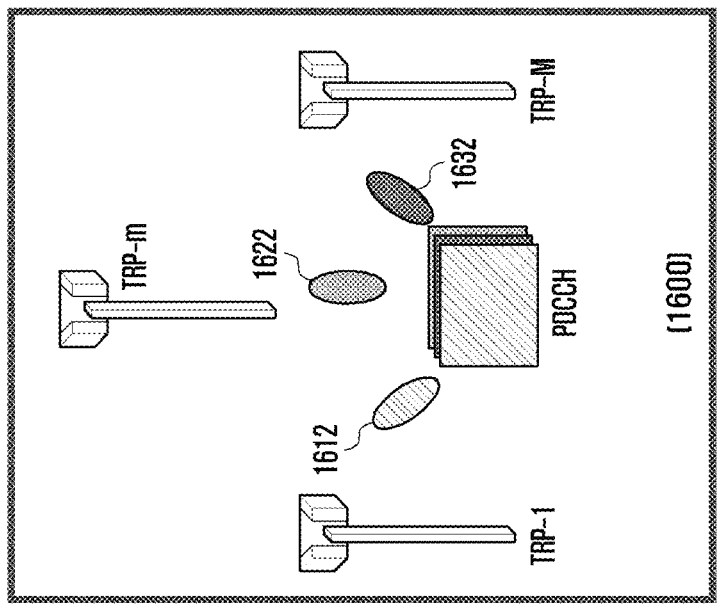
FIG. 16 illustrates an example of an SFNed PDCCH transmission from M TRPs and SRS transmission with N default beams according to an embodiment of disclosure.

FIG. 16 illustrates an example for SFNed PDCCH repetition from M=3 TRPs and SRS transmission with N=2 beams. In 1600, the PDCCH is received with three beams (1612, 1622, 1632). In this example, in 1650, the first default beam (1660) for SRS transmission is set by combining the spatial settings corresponding to beam-1 (1612) and beam-2 (1622). Consequently, it can be noticed that the combined beam (1660) is applied for both PL measurement as method I.3 and method II.3. This type of arrangement can be particularly useful when transmission to multiple TRPs can be conducted by closely related beams.

Considering the above generalization of mTRP environment setting, the wording in the embodiments for multiple default beam considerations can be modified as follows:

For method I 5.1 and method II 5.1 the wording "lowest and highest TCI state IDs are activated for the first and second beam (based on beam-repetition association pattern), respectively." can be replaced by "ascending order of N TCI states IDs starting from the lowest ID are activated for the N beams (based on beam-repetition association pattern), respectively";

For method I 5.2 and method II 5.2 the wording "first and last TCI states based on ordinal position in the MAC-CE activation are activated for the first and second beam (based on beam-repetition association pattern), respectively" can be replaced by "the first N TCI states, based on their ordinal position in the MAC-CE activation, are activated for the N beams (based on beam-repetition association pattern), respectively";

For method I 6.1 and method II 6.1 the wording "TCI states in the first and last CORESETs carrying the repeated PDCCH are activated for the first and second beam (based on beam-repetition association pattern), respectively" can be replaced by "TCI states in the first N CORESETs carrying the repeated PDCCH are activated for the N beams (based on beam-repetition association pattern), respectively";

For method I 6.2 and method II 6.2 the wording "TCI states in the first and last CORESETs carrying the repeated PDCCH are activated for the first and second beam (based on beam-repetition association pattern), respectively" can be replaced by "TCI states in the first N CORESETs carrying the repeated PDCCH are activated for the N beams (based on beam-repetition association pattern), respectively"; and For method I 7.1, method I 7.2, method II 7.1 and method II 7.2 the wording "where the QCL assumptions are set by linking TCI states corresponding to coresetPoolIndex 0 and 1 to the first and second beam (based on beam repetition pattern), respectively" can be replaced by "where the QCL assumptions are set by linking TCI states corresponding to coresetPoolIndex 0 and N–1 to the first N beams (based on beam repetition pattern), respectively."

Figure 17:
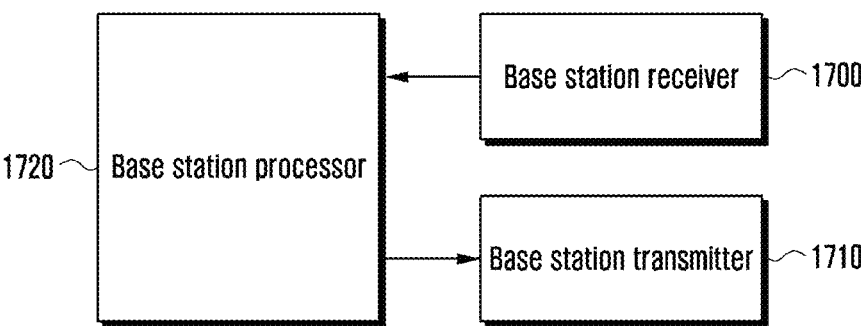
FIG. 17 is a block diagram illustrating a structure of a base station according to an embodiment of the disclosure.

FIG. 17 is a block diagram illustrating a structure of a base station according to an embodiment of the disclosure.

As illustrated in FIG. 17, the base station of the disclosure may include a base station receiver 1700, a base station transmitter 1710, and a base station processor 1720. The base station receiver 1700 and the base station transmitter 1710 may be collectively called a "transceiver" in an embodiment of the disclosure. The transceiver may transmit or receive a signal to or from the terminal. The signal may include control information and data. To this end, the transceiver may include a radio frequency (RF) transmitter configured to up-convert and amplify a frequency of a signal to be transmitted, and an RF receiver configured to low-noise amplify a received signal and down-convert a frequency. In addition, the transceiver may receive a signal via a wireless channel, may output the signal to the base station processor 1720, and may transmit, via the wireless channel, a signal output from the base station processor 1720. The base station processor 1720 may control a series of processes to make the base station operate according to the above-described embodiment of the disclosure.

Figure 18:
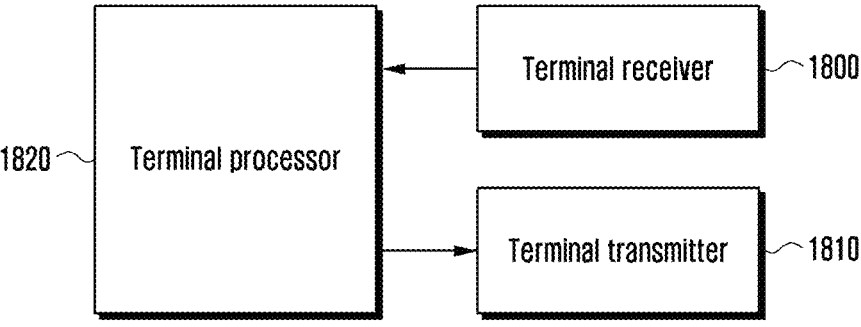
FIG. 18 is a block diagram illustrating a structure of a terminal according to an embodiment of the disclosure.

FIG. 18 is a block diagram illustrating a structure of a terminal according to an embodiment of the disclosure.

As illustrated in FIG. 18, the terminal of the disclosure may include a terminal receiver 1800, a terminal transmitter 1810, and a terminal processor 1820. The terminal receiver 1800 and the terminal transmitter 1810 may be collectively called a "transceiver" in an embodiment of the disclosure. The transceiver may transmit or receive a signal to or from the base station. The signal may include control information and data. To this end, the transceiver may include a radio frequency (RF) transmitter configured to up-convert and amplify a frequency of a signal to be transmitted, and an RF receiver configured to low-noise amplify a received signal and down-convert a frequency. In addition, the transceiver may receive a signal via a wireless channel, may output the signal to the terminal processor 1820, and may transmit, via the wireless channel, a signal output from the terminal processor 1820. The terminal processor 1820 may control a series of processes to make the terminal operate according to the above-described embodiment of the disclosure.

Although the present disclosure has been described with various embodiments, various changes and modifications may be suggested to one skilled in the art. It is intended that the present disclosure encompass such changes and modifications as fall within the scope of the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving, from a base station, an indicator indicating a default pathloss reference signal (PL-RS) for a sounding reference signal (SRS) is enabled;
receiving, from the base station, a medium access control (MAC) control element (CE) for indicating a plurality of transmission configuration indicator (TCI) states, wherein the plurality of TCI states are associated with a control resource set (CORESET) of a lowest index;
identifying an SRS transmission power based on a downlink pathloss (PL) obtained by the terminal; and
transmitting, to the base station, the SRS based on the identified SRS transmission power,
wherein the downlink PL for the SRS transmission power is based on a PL-RS with an RS resource index, and
wherein the RS resource index corresponds to a periodic RS resource configured as quasi-co-located (QCL) type D in a first TCI state among the plurality of TCI states, associated with the CORESET of the lowest index, indicated by the MAC CE, and the plurality of TCI state are associated with a same frequency network (SFN) scheme for a physical downlink control channel (PDCCH), and
wherein the first TCI state is a first TCI state with respect to an ordinal position in the MAC CE.

2. The method of claim 1, wherein the terminal is not provided PL reference RS information and spatial relation information.

3. The method of claim 1, further comprising:
identifying a QCL assumption based on the first TCI state associated with the CORESET of the lowest index,
wherein the SRS is transmitted according to the QCL assumption.

4. The method of claim 3, wherein the SFN scheme for the PDCCH is configured.

5. A method performed by a base station in a communication system, the method comprising:
transmitting, to a terminal, an indicator indicating a default pathloss reference signal (PL-RS) for a sounding reference signal (SRS) is enabled;
transmitting, to the terminal, a medium access control (MAC) control element (CE) for indicating a plurality of transmission configuration indicator (TCI) states, wherein the plurality of TCI states are associated with a control resource set (CORESET) of a lowest index; and
receiving, from the terminal, the SRS,
wherein an SRS transmission power of the SRS is based on a downlink pathloss (PL),
wherein the downlink PL for the SRS transmission power is based on a PL-RS with an RS resource index, and
wherein the RS resource index corresponds to a periodic RS resource configured as quasi-co-located (QCL) type D in a first TCI state among the plurality of TCI states, associated with the CORESET of the lowest index, indicated by the MAC CE, and the plurality of TCI state are associated with a same frequency network (SFN) scheme for a physical downlink control channel (PDCCH), and wherein the first TCI state is a first TCI state with respect to an ordinal position in the MAC CE.

6. The method of claim 5, wherein PL reference RS information and spatial relation information are not provided to the terminal.

7. The method of claim 5, wherein the SRS is associated with a QCL assumption based on the first TCI state associated with the CORESET of the lowest index.

8. The method of claim 7, wherein the SFN scheme for the PDCCH is configured.

9. A terminal in a communication system, the terminal comprising:
   a transceiver; and
   a controller coupled with the transceiver and configured to:
      receive, from a base station, an indicator indicating a default pathloss reference signal (PL-RS) for a sounding reference signal (SRS) is enabled,
      receive, from the base station, a medium access control (MAC) control element (CE) for indicating a plurality of transmission configuration indicator (TCI) states, wherein the plurality of TCI states are associated with a control resource set (CORESET) of a lowest index,
      identify an SRS transmission power based on a downlink pathloss (PL) obtained by the terminal, and
      transmit, to the base station, the SRS based on the identified SRS transmission power,
   wherein the downlink PL for the SRS transmission power is based on a PL-RS with an RS resource index, and
   wherein the RS resource index corresponds to a periodic RS resource configured as quasi-co-located (QCL) type D in a first TCI state among the plurality of TCI states, associated with the CORESET of the lowest index, indicated by the MAC CE, and the plurality of TCI state are associated with a same frequency network (SFN) scheme for a physical downlink control channel (PDCCH), and
   wherein the first TCI state is a first TCI state with respect to an ordinal position in the MAC CE.

10. The terminal of claim 9, wherein the terminal is not provided PL reference RS information and spatial relation information.

11. The terminal of claim 9, wherein the controller is further configured to identify a QCL assumption based on the first TCI state associated with the CORESET of the lowest index, and
   wherein the SRS is transmitted according to the QCL assumption.

12. The terminal of claim 11, wherein the SFN scheme for the PDCCH is configured.

13. A base station in a communication system, the base station comprising:
   a transceiver; and
   a controller coupled with the transceiver and configured to:
      transmit, to a terminal, an indicator indicating a default pathloss reference signal (PL-RS) for a sounding reference signal (SRS) is enabled,
      transmit, to the terminal, a medium access control (MAC) control element (CE) for indicating a plurality of transmission configuration indicator (TCI) states, wherein the plurality of TCI states are associated with a control resource set (CORESET) of a lowest index; and
      receive, from the terminal, the SRS,
   wherein an SRS transmission power of the SRS is based on a downlink pathloss (PL),
   wherein the downlink PL for the SRS transmission power is based on a PL-RS with an RS resource index, and
   wherein the RS resource index corresponds to a periodic RS resource configured as quasi-co-located (QCL) type D in a first TCI state among the plurality of TCI states, associated with the CORESET of the lowest index, indicated by the MAC CE, and the plurality of TCI state are associated with a same frequency network (SFN) scheme for a physical downlink control channel (PDCCH), and
   wherein the first TCI state is a first TCI state with respect to an ordinal position in the MAC CE.

14. The base station of claim 13, wherein PL reference RS information and spatial relation information are not provided to the terminal.

15. The base station of claim 13, wherein the SRS is associated with a QCL assumption based on the first TCI state associated with the CORESET of the lowest index.

16. The base station of claim 15, wherein the SFN scheme for the PDCCH is configured.

* * * * *